US009637385B2

(12) United States Patent
Biris et al.

(10) Patent No.: US 9,637,385 B2
(45) Date of Patent: May 2, 2017

(54) CARBON NANOTUBES AND METHODS OF FORMING SAME AT LOW TEMPERATURE

(71) Applicant: BOARD OF TRUSTEES OF THE UNIVERSITY OF ARKANSAS, Little Rock, AR (US)

(72) Inventors: Alexandru S. Biris, Little Rock, AR (US); Enkeleda Dervishi, Los Alamos, NM (US)

(73) Assignee: BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 0 days.

(21) Appl. No.: 14/531,543

(22) Filed: Nov. 3, 2014

(65) Prior Publication Data
US 2015/0125380 A1 May 7, 2015

Related U.S. Application Data

(63) Continuation of application No. 61/898,797, filed on Nov. 1, 2013.

(51) Int. Cl.
*C01B 31/02* (2006.01)
(52) U.S. Cl.
CPC ...... *C01B 31/0233* (2013.01); *C01B 31/0226* (2013.01)
(58) Field of Classification Search
CPC .................................................. C01B 31/02
USPC ............................... 423/447.1, 447.2, 447.7
See application file for complete search history.

(56) References Cited

U.S. PATENT DOCUMENTS

| | | | | |
|---|---|---|---|---|
| 2002/0160111 | A1* | 10/2002 | Sun ........................ | B82Y 10/00 427/248.1 |
| 2008/0280751 | A1* | 11/2008 | Harutyunyan .......... | B82Y 30/00 502/87 |
| 2009/0224435 | A1* | 9/2009 | Gogotsi ................... | B01J 23/52 264/442 |
| 2011/0008240 | A1* | 1/2011 | Inoue ..................... | B82Y 30/00 423/447.7 |
| 2012/0251432 | A1* | 10/2012 | Cooper ................ | B01J 37/0215 423/447.3 |

OTHER PUBLICATIONS

Dervishi, et al., Catalytic Conversion of Graphene into Carbon Nanotubes via Gold Nanoclusters at Low Temperatures, ACS Nano 2012; 6(1): 501-511 with Supporting Information (published online Dec. 21, 2011).*
Iijima, Sumio, "Helical microtubules of graphitic carbon", Nature, vol. 354, pp. 56-58, Nov. 7, 1991.
Javey, Ali et al., "High-k dielectrics for advanced carbon-nanotube transistors and logic gates", Nature Materials, vol. 1, pp. 241-246, Dec. 2002.
Li, Jun et al., "Bottom-up approach for carbon nanotube interconnects", Applied Physics Letters, vol. 82: No. 15, pp. 2491-2493, Apr. 14, 2003.
Shang, N.G. et al., "High-rate low-temperature growth of vertically aligned carbon nanotubes", Nanotechnology, vol. 21:505604, pp. 1-6, Published: Nov. 23, 2010.
Dervishi, Enkeleda et al., "The Influence of Fe—Co/MgO Catalyst Composition on the Growth Properties of Carbon Nanotubes", Particulate Science and Technology: An International Journal, Taylor & Francis Group, vol. 27, pp. 222-237, 2009.
Sharma, Renu, "In situ observations of carbon nanotube formation using environmental transmission electron microscopy", Applied Physics Letters, vol. 84: No. 6, pp. 990-992, Feb. 9, 2004.
Wang, Wenzhong et al., "Low-temperature hydrothermal synthesis of multiwall carbon nanotubes", Letters to the Editor/Carbon, vol. 43, pp. 1328-1331, 2005.
Wang, Wenzhong et al., "High-Yield Synthesis of Single-Crystalline Antimony Telluride Hexagonal Nanoplates Using a Solvothermal Approach", J. Am. Chem. Soc., vol. 127, pp. 13792-13793, Published on Web: Sep. 17, 2005.
Vohs, Jason et al., "Low-Temperature Growth of Carbon Nanotubes from the Catalytic Decomposition of Carbon Tetrachloride", J. Am. Chem. Soc., vol. 126, pp. 9936-9937, Published on Web: Jul. 23, 2004.
Wang, Xinjun et al., "A Novel Route to Multiwalled Carbon Nanotubes and Carbon Nanorods at Low Temperature" J. Phys. Chem. B, vol. 106, pp. 933-937, Published on Web: Jan. 9, 2002.
Ziebro, Janusz et al., "Low temperature growth of carbon nanotubes from methane catalytic decomposition over nickel supported on a zeolite" Nanotechnology, vol. 21:145308, pp. 1-6, Published: Mar. 16, 2010.
Cao, Xiehong et al., "Graphene Oxide as a Carbon Source for Controlled Growth of Carbon Nanowires", SMALL, vol. 7: No. 9, pp. 1199-1202, 2011.
Hunley, D.P. et al., "Crystallographically Aligned Carbon Nanotubes Grown on Few-Layer Graphene Films" ACS Nano, vol. 5; No. 8, pp. 6403-6409, Published online: Jul. 12, 2011.
Moreno, Jose Maria et al., "Hydrothermal Processing of High-Quality Multiwall Nanotubes from Amorphous Carbon", J Am. Chem. Soc., vol. 123, pp. 741-742, Published on Web: Jan. 6, 2001.
Takagi, Daisuke et al., "Carbon Nanotube Growth from Diamond", J. Am. Chem. Soc., vol. 131, pp. 3922-6923, Published on Web: Apr. 30, 2009.
Dervishi, Enkeleda et al., "Catalytic Conversion of Graphene into Carbon Nanotubes via Gold Nanoclusters at Low Temperatures" ACS Nano, vol. 6: No. 1, pp. 501-511, Published online: Dec. 12, 2011.

(Continued)

*Primary Examiner* — Daniel C McCracken
(74) *Attorney, Agent, or Firm* — Tim Tingkang Xia, Esq.; Locke Lord LLP

(57) ABSTRACT

In one aspect of the invention, a method for growth of carbon nanotubes includes providing a graphitic composite, decorating the graphitic composite with metal nanostructures to form graphene-contained powders, and heating the graphene-contained powders at a target temperature to form the carbon nanotubes in an argon/hydrogen environment that is devoid of a hydrocarbon source. In one embodiment, the target temperature can be as low as about 150° C. (±5° C.).

21 Claims, 8 Drawing Sheets

(56) References Cited

OTHER PUBLICATIONS

Lin, Yi et al., "Instantaneous Formation of Metal and Metal Oxide Nanoparticles on Carbon Nanotubes and Graphene via Solvent-Free Microwave Heating", Applied Materials & Interfaces, vol. 3, pp. 1652-1664, Published: Apr. 25, 2011.
Ren Lulu et al., "One-step preparation of hierarchical superparamagnetic iron oxide/graphene composites via hydrothermal method", Applied Surface Science, vol. 258, pp. 1132-1138, Available online: Sep. 17, 2011.
Xue, Yuhua et al., "Oxidizing metal ions with graphene oxide: the in situ formation of magnetic nanoparticles on self-reduced graphene sheets for multifunctional applications", Chem. Commun., vol. 47, pp. 11689-11691, Accepted: Sep. 14, 2011.
Liang, Jiajie et al., "Electromechanical Actuators Based on Graphene and Graphene/Fe3O4 Hybrid Paper", Advanced Functional Materials, vol. 21, pp. 3778-3784, 2011.
Li, Xiyan et al., "Synthesis of 3D Hierarchical Fe3O4/Graphene Composites with High Lithium Storage Capacity and for Controlled Drug Delivery", J. Phys. Chem. C, vol. 115, pp. 21567-21573, Published: Sep. 25, 2011.
Zhang, Ming et al., "Magnetite/graphene composites: microwave irradiation synthesis and enhanced cycling and rate performances for lithium ion batteries", J. Mater. Chem., vol. 20, pp. 5538-5543, Published as an Advanced Article on the Web: Jun. 3, 2010.
Liu, Mancheng et al., "Synthesis of Magnetite/Graphene Oxide Composite and Application for Cobalt(II) Removal", J. Phys. Chem. C, vol. 115, pp. 25234-25240, Published: Nov. 28, 2011.
Zhu, Jiahua et al., "One-Pot Synthesis of Magnetic Graphene Nanocomposites Decorated with Core@Double-shell Nanoparticles for Fast Chromium Removal", Environ. Sci. Technology, vol. 46, pp. 977-985, Published: Nov. 29, 2011.
Wu, Xi-Lin et al., "Water-dispersible magnetite-graphene-LDH composites for efficient arsenate removal", J. Mater. Chem., vol. 21, pp. 17353-17359, Accepted: Aug. 15, 2011.
Wu, Qiuhua et al., "Preparation of a graphene-based magnetic nanocomposite for the extraction of carbamate pesticides from environmental water samples", Journal of Chromatography A, vol. 1218, pp. 7936-7942, Available online: Sep. 16, 2011.
Zhao, Guangying et al., "Determination of triazine herbicides in environmental water samples by high-performance liquid chromatography using graphene-coated magnetic nanoparticles as adsorbent", Analytica Chimica Acta, vol. 708, pp. 155-159, Available online: Oct. 14, 2011.
Cong, Huai-Ping et al., "Water-Soluble Magnetic-Functionalized Reduced Graphene Oxide Sheets: In situ Synthesis and Magnetic Resonance Imaging Applications", SMALL, vol. 6: No. 2, pp. 169-173, 2010.
Zhou, Kangfu et al., Preparation and Application of Mediator-Free H2O2 Biosensors of Graphene-Fe3O4 Composites, Electroanalysis, vol. 23: No. 4, pp. 862-869, Accepted: Nov. 28, 2010.
Biris, Alexandru R. et al., "Novel Multicomponent and Biocompatible Nanocomposite Materials Based on Few-Layer Graphenes Synthesized on a Gold/Hydroxyapatite Catalytic System with Applications in Bone Regeneration", J. Phys. Chem. C., vol. 115, pp. 18967-18976, Published: Aug. 24, 2011.
Pruneanu, Stela et al., "Novel Graphene-Gold Nanoparticle Modified Electrodes for the High Sensitivity Electrochemical Spectroscopy Detection and Analysis of Carbamazepine", J. Phys. Chem. C, vol. 115, pp. 23387-23394, Published: Oct. 18, 2011.
Yu, Aiping et al., "Free-Standing Layer-By-Layer Hybrid Thin Film of Grphene-MnO2 Nanotube as Anode for lithium Ion Batteries", J. Phys. Chem. Lett., vol. 2, pp. 1855-1860, Published: Jul. 11, 2011.
Su, Jing et al., "Fe3O4-Graphene Nanocomposites with Improved Lithium Storage and Magnetism Properties", J. Phys. Chem. C, vol. 115, pp. 14469-14477, Published: Jun. 30, 2011.
Chen, Ming-Liang et al., "Synthesis and Characterization of Metal (PT, Pd and Fe)-graphene Composites", Journal of be Korean Ceramic Society, vol. 48: No. 2, pp. 147-151, Accepted: Mar. 9, 2011.
Mora, Elena et al., "Low-Temperature Single-Wall Carbon Nanotubes Synthesis: Feedstock Decomposition Limited Growth", J. Am. Chem. Soc., vol. 130, pp. 11840-11841, Published on Web: Aug. 16, 2008.
Biris, Alexandru R. et al., "Effect of Hydrogen on the growth and morphology of single wall carbon nanotubes synthesized on a Fe—Mo/MgO catalytic system", Physics Letters A, vol. 372, pp. 3051-3057, Available online: Jan. 16, 2008.
Behrens, Malte et al., "The Active Site of Methanol Synthesis over Cu/ZnO/Al2O3 Industrial Catalyst", Science, vol. 336, pp. 893-897, May 18, 2012.
Pineau, A. et al., "Kinetics of reduction of iron oxides by H2 Part I: Low temperature reduction of hematite", Thermochimica Acta, vol. 447, pp. 89-100, Available online: Nov. 23, 2005.
Pineau, A. et al., "Kinetics of reduction of iron oxides by H2 Part II. Low temperature reduction of magnetite" Thermochimica Acta, vol. 456, pp. 75-88, Available online: Jan. 20, 2007.
Wimmers, O.J. et al., "Determination of the Reduction Mechanism by Temperature-Programmed Reduction: Application to Small Fe2O3 Particles", J. Phys. Chem., vol. 90: No. 7, pp. 1331-1337, In Final Form: Oct. 22, 1985.
Munteanu, G. et al., "Kinetic parameters obtained from TPR data for x-Fe2O3 and Au/x-Fe2O3 systems", Thermochimica Acta, vol. 291, pp. 171-177, Accepted: Oct. 8, 1996.
Han, Sang-Soo et al., "Effect of Shuttling Catalyst on the Migration of Hydrogen Adatoms: A Strategy for the Facile Hydrogenation of Graphene", J. Phys. Chem. C, vol. 115, pp. 24696-24701, Published: Nov. 16, 2011.
Chen, Liang et al., "A mechanistic study of hydrogen spillover in MoO3 and carbon-based graphitic materials", Journal of Physics: Condensed Matter, vol. 20:064223, pp. 1-8, Published: Jan. 24, 2008.
Zhang, Yi et al., "Anisotropic Hydrogen Etching of Chemical Vapor Deposited Graphene", ACS Nano, vol. 6: No. 1, pp. 126-132, Published online: Oct. 19, 2011.
Han, Sang Soo et al., "Stability of hydrogenation states of graphene and conditions for hydrogen spillover", Physical Review B, vol. 85:155408, pp. 1-5, Published: Apr. 4, 2012.
Kayanuma, Megumi et al., "Adsorption and diffusion of atomic hydrogen on a curved surface of microporous carbon: A theoretical study", Chemical Physics Letters, vol. 495, pp. 251-255, Available online: Jun. 30, 2010.
Dervishi, Enkeleda et al aL, "Low-temperature (150 C) carbon nanotube growth on a catalytically active iron oxide-graphene nano-structural system", Journal of Catalysis, vol. 299, pp. 307-315, Available online: Jan. 30, 2013.
Sivakumar, V.M. et al., "Optimized Parameters for Carbon Nanotubes Synthesis Over Fe and Ni Catalysts Via Methane CVD", Rev. Adv. Mater. Sci., vol. 27, pp. 25-30, Received: Apr. 27, 2010.
Martin, M.N. et al., "Charged Gold Nanoparticles in Non-Polar Solvents: 10-min Synthesis and 2D Self-Assembly", Langmuir, vol. 26(10), pp. 7410-7417, Published on Web: Apr. 14, 2010.
Viswanathan, Tito et al., "Evaluation of a Renewable Resource-based Carbon-Iron Oxide Nanocomposite for Removal of Arsenic from Contaminated Water", Journal of Macromolecular Science, Part A: Pure and Applied Chemistry, vol. 48, pp. 348-354, Received & Accepted: Nov. 2010.

* cited by examiner

CARBON NANOTUBES AND METHODS OF FORMING SAME AT LOW TEMPERATURE

CROSS-REFERENCE TO RELATED PATENT APPLICATION

This application claims priority to and the benefit of, pursuant to 35 U.S.C. §119(e), U.S. provisional patent application Ser. No. 61/898,797, filed Nov. 1, 2013, entitled "CATALYTIC REACTIONS INITIATED BY A NEW CLASS OF CATALYST MATERIALS BASED ON GRAPHITIC MATERIALS AND METAL NANOSTRUCTURES," by Alexandru S. Biris and Enkeleda Dervishi, which is incorporated herein in its entirety by reference.

Some references, which may include patents, patent applications and various publications, are cited and discussed in the description of this disclosure, which includes, among other things, exhibits and drawings, if any. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [20] represents the 20th reference cited in the reference list, namely, E. Dervishi, S. Bourdo, J. A. Driver, F. Watanabe, A. R. Biris, A. Ghosh, B. Berry, V. Saini, A. S. Biris, ACS Nano 2012 (2012) 501.

STATEMENT AS TO RIGHTS UNDER FEDERALLY-SPONSORED RESEARCH

This invention was made with government support under EPS-1003970 awarded by the National Science Foundation VICTER Project, and under DE-FG36-06G086072 awarded by the Department of Energy. The government has certain rights in the invention.

FIELD OF THE INVENTION

The present invention relates generally to a method for forming carbon nanotubes (CNTs), and more specifically related to a method for forming CNT using a catalytic material based on graphitic materials and metal nanostructures at a low temperature.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

Since the discovery of carbon nanotubes (CNTs), numerous efforts have been focused on finding technological approaches to lower their corresponding synthesis temperature, which could make the growth of these nano-materials more practical for various applications especially in the nano-electronic and field emission areas [1-4]. More specifically, since complementary metal-oxide-semiconductor (CMOS) devices are generally fabricated at temperatures below 400° C., lowering the CNT growth temperature is imperative for their incorporation in hybrid, complex electronic devices [5]. However, the most common growth temperatures for CNTs, depending on the catalyst system and the synthesis conditions, range between 700-1000° C. [6-9]. Compared to other synthesis techniques, chemical vapor deposition (CVD) remains the most popular method and has been widely used to synthesize CNTs at lower temperatures in controlled conditions resulting in nanomaterials with excellent morphologies and characteristics [10]. More recently, several groups have been working to synthesize CNTs at very low temperatures (below 300° C.) with and without the presence of catalyst systems. Wang et al. have reported the growth of multi-walled carbon nanotubes (MWCNTs) at 160° C. by the decomposition of polyethylene glycol using a hydrothermal synthesis without the addition of catalyst Fe/Co/Ni [11]. Since this reaction requires 20 hours, it is time-consuming and inconvenient. Wang et al. were able to improve the quality and yield of MWCNTs by increasing the synthesis temperature to 180° C. [12]. Vohs et al. reported the lowest synthesis temperature (175° C.) for MWCNTs, using $CCl_4$ as a precursor along with metal-encapsulated dendrimers as catalysts in a 24-hour treatment at 27.6 MPa [13]. However, this method was reported to produce relatively low-quality nanotubes and could have limited practicality for industrial applications, since it requires high pressure and a lengthy synthesis time.

Moreover, low-quality MWCNTs or nanorods were synthesized on various catalysts, such as Fe, Au, or Ag, utilizing tetrachloroethylene as the carbon feedstock; reactions were performed in the presence of benzene and potassium and kept at 200° C. for 27 hours [14]. Vertically aligned MWCNTs have been synthesized using a photo-thermal chemical vapor deposition technique on a Ti/Fe catalyst film at temperatures as low as 370° C. [5]. Others have demonstrated the growth of CNTs using the CVD method on catalyst systems, such as Ni supported on zeolite and Ti/Fe on $SiO_2$ from methane at temperatures between 350-600° C. [15]. Additionally, Sharma et al. have reported in situ observations of nanotube growth over Ni or Co catalysts at 450° C. [10].

Therefore, a heretofore unaddressed need exists in the art to address the aforementioned deficiencies and inadequacies.

SUMMARY OF THE INVENTION

In one aspect, the invention relates to a method for growth of carbon nanotubes. In one embodiment, the method includes preparing graphene-contained powders, and heating the graphene-contained powders at a target temperature to form the carbon nanotubes.

In one embodiment, the target temperature is in a range of about 50-1000° C. In one embodiment, the target temperature is in a range of about 150-500° C. In one embodiment, the target temperature is in a range of about 300-500° C.

In one embodiment, the graphene-contained powders include graphene sheets that are decorated with metal or metal oxide nanoparticles.

In one embodiment, the graphene sheets include multi-layered graphene sheets.

In one embodiment, the metal or metal oxide nanoparticles include a metal of Fe, Mo, Ni, Co, Pt, Pd, Au, Ag, Si, Ni, Zr, or the like, or a metal oxide thereof, or a combination of them.

In one embodiment, the metal oxide nanoparticles include iron oxide nanoparticles.

In one embodiment, the step of preparing the graphene-contained powders includes the steps of preparing the graphene sheets having an average dimension of several microns, treating the graphene sheets with a first solution having carboxylic groups to form a second solution, filtering, washing and drying the second solution to form a functionalized grapheme powders, dispersing the functionalized graphene powders in water homogenously to form a third solution, adding carboxylated iron oxide nanoparticles with the third solution to form a fourth solution, and filtering and drying the fourth solution to form the iron oxide-graphene powders.

In one embodiment, the first solution includes sulfuric and nitric acid. In one embodiment, a ratio of the sulfuric and nitric acid is about 3:1.

In one embodiment, the step of treating the graphene sheets with the first solution having the carboxylic groups to form the second solution further includes stirring the graphene sheets in the first solution.

In one embodiment, the step of dispersing the functionalized graphene powders in water homogenously to form the third solution is performed by adding the functionalized graphene powders in a deionized water such that the concentration of graphene in the deionized water is about 1 mg/ml.

In one embodiment, the carboxylated iron oxide nanoparticles have a diameter in a range of about 1-50 nm. In one embodiment, the carboxylated iron oxide nanoparticles have a diameter of about 5 or 15 nm.

In one embodiment, the carboxylated iron oxide nanoparticles and the third solution are mixed in a 1:1 ratio through sonication.

In one embodiment, the fourth solution is dried at a temperature in a range of about 50-150° C. In one embodiment, the fourth solution is dried at a temperature of about 100° C.

In one embodiment, the step of heating the graphene-contained powders to form the carbon nanotubes is performed using an electrical furnace. In another embodiment, the step of heating the graphene-contained powders to form the carbon nanotubes is performed using a radio-frequency (RF) generator with a frequency. In one embodiment, the frequency is in a range of about 100-700 kHz.

In one embodiment, the step of heating the graphene-contained powders to form the carbon nanotubes is performed in an argon/hydrogen environment that is devoid of a hydrocarbon source.

In one embodiment, the step of heating the graphene-contained powders to form the carbon nanotubes includes the steps of spreading the iron-oxide-graphene powders on a graphite boat placed inside a quartz tube that is positioned at a center of a generator coil of the RF generator, flushing the iron-oxide-graphene powders with argon, turning on the RF generator, heating the iron oxide-graphene powders to the target temperature, adding hydrogen in the graphite boat at a desired rate for a predetermined time, turning off the RF generator and stopping adding the hydrogen, and cooling it to the room temperature under an argon flow.

In another aspect, the invention relates to a method for growth of carbon nanotubes. In one embodiment, the method includes the steps of providing a graphitic composite, decorating the graphitic composite with metal nanostructures to form graphene-contained powders, and heating the graphene-contained powders at a target temperature to form the carbon nanotubes in an argon/hydrogen environment that is devoid of a hydrocarbon source.

In one embodiment, the graphitic composite includes graphene sheets, multi-layered graphenes, graphite fullerenes, nanofibers, or nanowires.

In one embodiment, the metal nanostructures include metal or metal oxide nanoparticles.

In one embodiment, the metal or metal oxide nanoparticles have a diameter in a range of about 1-50 nm.

In one embodiment, the metal or metal oxide nanoparticles include a metal of Fe, Mo, Ni, Co, Pt, Pd, Au, Ag, Si, Ni, Zr, or the like, or a metal oxide thereof, or a combination of them.

In one embodiment, the step of heating the graphene-contained powders to form the carbon nanotubes is performed using an electrical furnace. In another embodiment, the step of heating the graphene-contained powders to form the carbon nanotubes is performed using a radio-frequency (RF) generator.

In one embodiment, the target temperature is about 50-1000° C.

In certain aspect, the invention relates to nanotubes formed by the above-disclosed methods.

These and other aspects of the invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
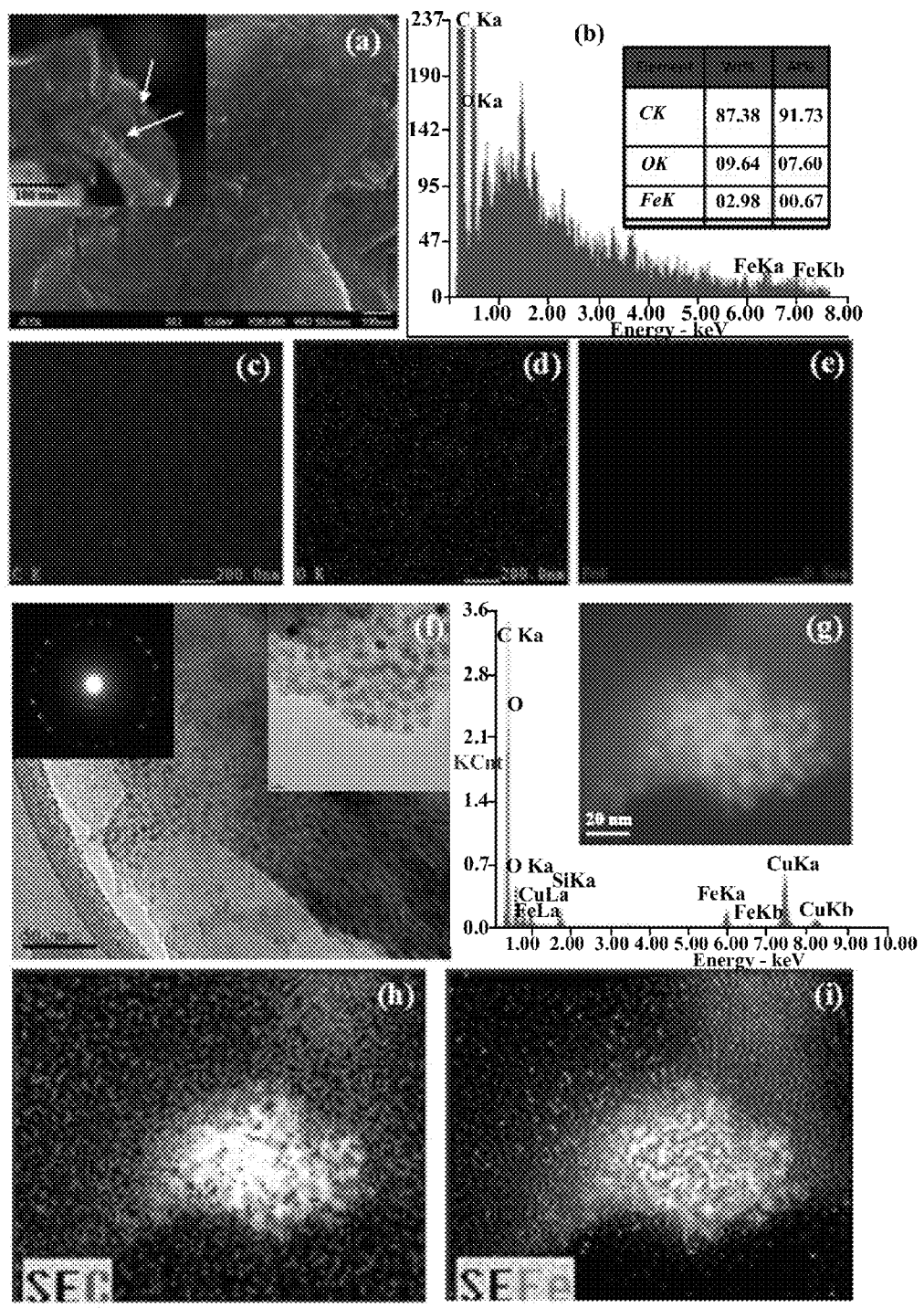
FIG. 1 shows (a) (and its inset): SEM image of the graphene sheets decorated with iron oxide nanoparticles (indicated by the white arrows), (b)-(e): SEM/EDS analysis (maps) indicating the presence of C, O, and Fe, (f) (and its inset): Low- and high-resolution TEM images of the iron oxide nanoparticles deposited on the graphene sheets. The inset shows the Electron Diffraction Pattern of the decorated sample, (g): EDS spectrum of the decorated graphene sheet. (The Cu signal comes from the support grid.) The inset in (g): STEM image of the iron oxide nanoparticles decorating the graphene structures. EDS maps of C—K X-ray signals (in red) (h) and Fe—K signals (in purple) (i) overlaid on the STEM image shown in (g), according to one embodiment of the present invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the FIGS. is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the FIGS. is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the invention.

The description below is merely illustrative in nature and is in no way intended to limit the disclosure, its application, or uses. The broad teachings of the invention can be implemented in a variety of forms. Therefore, while this disclosure includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

New nano-materials composed of 1- and 2-dimensional carbon structures with improved electronic and mechanical properties have been prepared by growing nanotubes or nanowires on graphite or graphite-derived products coated with various catalytic nanoparticles, such as Co and Ni [16, 17]. These reactions were found to take place at high temperatures (900-1000° C.) with or without the addition of hydrocarbons. Furthermore, pristine MWCNTs were grown on amorphous carbon after a hydrothermal treatment at 800° C. [18]. Amorphous carbon or graphite coated with nano-diamonds has been used to grow nanotubes at 850° C. during the pyrolysis of ethanol[19]. Recently, the inventors were able to lower the CNT synthesis temperature using an Au catalyst deposited on graphene sheets, and demonstrated the catalytic conversion of Au-decorated graphene into CNTs without the addition of a hydrocarbon source at temperatures as low as 500° C. [20].

Taken alone, both graphene and inorganic nanoparticles have the potential to impact a plethora of complex technical applications. A major advantage in the use of graphene is its high surface area, which allows increased interactions with other materials, especially when metal oxide nanoparticles can be decorated on the graphene surface. In order to take advantage of the chemistry of these composite materials, several routes have been employed for composite preparations, including microwave heating [21] and hydrothermal treatment in an autoclave [22]. Xue et al. demonstrated a method that utilized the oxidizing nature of graphene oxide to form monodispersed magnetite from iron ions and concomitant reduction of the oxygen functionalities on the graphene surface [23]. On the other hand, the many unique electrical, magnetic, and mechanical properties of iron oxide-based carbon composites make them well-suited for use as actuators [24] and batteries/supercapacitors [25, 26]. Several researchers have demonstrated that iron oxide (i.e., magnetite) composites can be utilized for removal of environmental pollutants with specific examples cited for heavy metals such as Co [27], Cr [28], and As [29].

In one instance, the magnetite-graphene was utilized to grow layered double-hydroxides of Mg and Al in order to remove arsenate more effectively [30]. Along with these materials' ability to remove heavy metals from the environment, they are also useful for pesticide remediation[31, 32]. The controlled release of drugs bound to the surface of magnetite nano-composites [33], magnetic resonance imaging (MRI) techniques [34], and $H_2O_2$ biosensors [35] are other potential uses of these multifunctional materials. Furthermore, being able to control certain parameters such as the size and ratio of nanoparticle-to-graphene[36, 37] and incorporating CNTs into these composites affords the possibility for widespread applications to be realized [38].

Growing Carbon nanotubes (CNTs) fabricated at low temperature is of particular interest because of their physiochemical properties. Developing an efficient low-temperature growth method for high purity and crystalline CNTs and selecting the right substrate is crucial for their integration in novel devices [5]. The synthesis reactions were repeated for the graphene decorated with the 15 nm iron oxide nanoparticles, which resulted in CNT formation only at 400° C. or higher. Continues efforts are being made to optimize the synthesis to maximum functionality of the formed nanoparticles.

In one aspect, the invention relates to a method for the growth of MWCNTs on iron oxide-decorated graphene sheets at low temperatures, for example, as low as about 150° C. (±5° C.), without addition of any hydrocarbon source. This is the lowest temperature reported to date for nanotube synthesis on metal-decorated graphene.

In certain embodiments, CNT growth was demonstrated at temperatures between about 150-500° C. using two different heating methods (RF generator and electrical furnace). In certain embodiments, a method for growing CNTs and/or MWCNTs on iron oxide-decorated graphene sheets, which is a multi-component, nano-structural system, is provided. The method in one embodiment is performed at temperatures as low as about 150° C. (±5° C.), in a short period of time, under low pressure, without adding any hydrocarbon source. In one embodiment, the heating source can be a chemical vapor deposition (CVD). The produced CNTs have high quality and show excellent morphologies and characteristics.

These findings highlight the complex nature of the catalytic activity of nano-structural materials as a function of their size and their morphological properties. Additionally, the radio-frequency chemical vapor deposition (RF-CVD) utilized for low-temperature growth of nanotubes. Using only an argon/hydrogen mixture (no hydrocarbons or other gases), makes this method very inexpensive and convenient for large-scale applications. Another advantage of this approach is the facile one-step process used for the decoration of graphene with iron oxide nanoparticles, which could be utilized in other applications as well. In this fabrication method, neither hydrocarbons nor catalyst were added. It is a completely compatible method with exible substrates like metals or metal oxides, irrespective of their shapes and sizes. This low-temperature, facile technique opens the door to a wide range of applications for these novel nanoparticle/graphene-nanotube systems in areas varying from nano-electronics and energy harvesting to bio-nano.

In one aspect, the present invention is directed to a method for producing carbon nanotubes. The method includes preparing graphene-contained powders, and treating the graphene-contained powders to form the carbon nanotubes.

In one embodiment, the graphene-contained powders include metal or metal oxide nanoparticles decorated on a graphene sheet. In certain embodiments, the metal or metal oxide is nanoparticles.

In one embodiment, the metal oxide is iron oxide.

In one embodiment, the iron oxide-graphene powders are provided by preparing a graphene sheet having an thickness of a few microns, treating the graphene sheet with a first solution having carboxylic groups to form a second solution, filtering, washing and drying the second solution to form functionalized graphene powders, dispersing the functionalized graphene powders in water homogenously to form a third solution, mixing carboxylated iron oxide nanoparticles with the third solution to form a fourth solution, and filtering and drying the fourth solution to form the iron oxide-graphene powders.

In certain embodiments, few-layer graphene sheets are decorated with iron oxide nanoparticles using a simple one-step process, which could be utilized in other applications as well. In comparison, the conventional art normally utilizes rather complex methods involving several steps and various chemical agents to link nanoparticles to graphene. After the preparation, the iron oxide-graphene is thoroughly characterized by electron microscopy.

In one embodiment, the first solution further includes a mixture of sulfuric and nitric acid at an about 3:1 molar ration. Alternatively, other reagents and other molar rations can also be used to facilitate the carboxylation of the grapheme.

In one embodiment, the step of treating the grapheme sheet with the first solution further includes stirring the graphene sheet and the first solution so that the grapheme is evenly distributed in the solution.

In one embodiment, the step of dispersing the functionalized graphene powders in water is performed by adding the graphene powders in a deionized water such that the concentration of graphene in the deionized water is about 1 mg/ml. Alternatively, a solvent other than DI water or varies concentration of the graphene in the solution can be used. In certain embodiments, the concentration of graphene in the DI water can be about 0.1-10 mg/ml.

In certain embodiments, the carboxylated iron oxide nanoparticles have a diameter of about 0.5-100 nm. In one embodiment, the carboxylated iron oxide nanoparticles have a diameter of about 5 nm. In another embodiment, the carboxylated iron oxide nanoparticles have a diameter of about 15 nm.

In one embodiment, the metal nanoparticles can include metal and metal oxides such as, but not limited to: Mo, Ni, Co, Pt, Pd, Au, Ag, Si, Ni, Zr, or any other metal or metal oxides or mixtures of them. The metal/metal oxides nanoparticles can have any shape, size or loading. The same principle can also be applied when decorating graphene sheets or few layer graphenes or graphite or carbon nanotubes, or fullerenes, or nanofibers/nanowires with other type of nano-particles such as Mo, Ni, Co, Pt, Pd, Au, Ag, Si, Ni, Zr, or any other metal or metal oxide.

In certain embodiments, the ratio of the carboxylated iron oxide nanoparticles to the third solution is about 0.1:1 to about 1:10. In one embodiment, the carboxylated iron oxide nanoparticles and the third solution are mixed in an about 1:1 ratio through sonication for a predetermined period of time about 3 hours. The predetermined period of time of the sonication can be about 0.3 hour to about 10 hours. In one embodiment, the predetermined period of time of the sonication is about 3 hours. Alternatively, other ratio of the carboxylated iron oxide nanoparticles and the third solution can be used to practice this invention.

In certain embodiments, the fourth solution is dried in about 4-50 hours with a drying temperature in a range of about 50-150° C. or varying during drying process. In one embodiment, the fourth solution is dried overnight at about 100° C. Alternatively, other drying method and time of drying can be used to practice this invention according to the requirement of certain embodiments.

In one embodiment, the step of treating the iron oxide-graphene powders to form the carbon nanotubes is performed by an RF-CVD in a radio-frequency (RF) generator, and includes spreading about 10 mg of the iron-oxide-graphene powders on a graphite boat and placing it inside a quartz tube positioned at a center of a generator coil of the RF generator, flushing with argon at about 150 ml/min for about 10 minutes, turning on the RF generator, heating the iron oxide-graphene powders to a target temperature, adding hydrogen at about 100 ml/min for about 30 minutes, turning off the RF generator and the hydrogen, and cooling it to room temperature under argon flow for about 10 minutes. Alternatively, the amount of material used and the time of each step can be varied. In certain embodiments, the amount of the iron oxide-graphene powders to be treated can be from about 1 mg to about 100 mg, or greater than about 100 mg. The flushing rate of argon can be about 10-1000 ml/min, and the flushing period of time can be about 1 minute to about 100 minutes or greater. The hydrogen can be added at a rate of about 10 ml/min to about 1000 ml/min or greater. The adding time for the hydrogen can be about 1 minute to about 100 minutes or greater. The cooling can be performed with or without argon. The cooling period of time can be about 1 minute to about 100 minutes or greater.

The RF-CVD utilized in certain embodiments is a straightforward and rapid technique for low-temperature growth of nanotubes. Alternatively, electrical furnace can also be used as the heating source. In certain embodiments, the CNT growth is achieved at temperatures between about 150-500° C. using one of two different heating methods, i.e., RF generator and electrical furnace. Alternatively, other heating device or method can be used to practice the invention when appropriate.

In certain embodiments, the method for producing CNTs uses only an argon/hydrogen mixture, and no hydrocarbons or other gases are presented, which makes this method very inexpensive and convenient for large-scale applications.

In certain embodiments, the catalytic activity is complicated and relates nano-structural materials as a function of their size and their morphological properties.

In one embodiment, the iron oxide-graphene is prepared using iron oxide nanoparticles having a diameter of about 5 nm, and the target temperature is about 50-1000° C. In one embodiment, the target temperature can be about 150-500° C.

In one embodiment, the iron oxide-graphene is prepared using iron oxide nanoparticles having a diameter of about 15 nm, and the target temperature is about 300-500° C. In certain embodiments, when the size of iron oxide nanoparticles used is about 15 nm, the CNTs formed from only at about 400° C. or higher. In certain embodiments, the target temperature can be about 50-1000° C.

The synthesis temperature is varied at about 150-500° C. and the presence of nanotubes is confirmed by transmission and scanning electron microscopy. In certain embodiments, while the graphene decorated with about 5 nm iron oxide nanoparticles form nanotubes at the lowest temperature of about 150° C., the decorated samples with larger nanoparticles at about 15 nm only initiate nanotube growth at about 400° C. or higher, indicating a strong size-dependence on the catalytic activity of these nanoparticles.

In one embodiment, nanotubes are prepared by the above method. The nanotubes prepared by the above described method have a high quality.

In addition, the method can also be used to produce nanowires, nanorods or other types of nanostructures.

Without intent to limit the scope of the invention, examples and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

EXAMPLE

Low-Temperature CNT Growth on a Catalytically Active Iron Oxide-Graphene Nano-Structural System 1. Experiment Details High purity and crystalline graphene was purchased from Ångstron Materials, Inc. (Dayton, Ohio), and thoroughly characterized by electron microscopy and thermal-gravimetrical analysis as previously shown [20]. Microscopic analysis revealed the presence of few-layer graphene sheets with average dimensions of several microns. Next, the graphene was functionalized with carboxylic groups through a treatment in sulfuric and nitric acid (about 3:1 ratio) and stirred overnight to form a solution [20]. Finally, the solution was filtered and continuously washed with DI water until the pH was neutral; it was then dried overnight in an oven at about 80° C. The functionalized graphene powders were homogenously dispersed in DI water (about 1 mg/ml) using a tip-sonicator for about 30 minutes. Carboxylated iron oxide nanoparticles with two different diameters (about 5 or 15 nm) were purchased from Ocean Nanotech, LLC (Springdale, Ark.), and separately added to the graphene solution (1:1 ratio) through sonication for about 3 hours. Next, the mixture was filtered and dried overnight at about 100° C., and the final iron oxide-graphene powders were characterized by electron microscopy.

Synthesis reactions were carried out using a RF generator with a frequency of about 350 kHz. For each RF-CVD reaction, approximately 10 mg of the iron oxide-graphene mixture were spread on a graphite boat and placed inside a quartz tube positioned at the center of the generator coil. The RF generator was turned on after the sample was first flushed with argon at about 150 ml/min for about 10 minutes. Once the iron oxide-graphene was heated to the target temperature, hydrogen was added at about 100 ml/min for about 30 minutes. Subsequently, hydrogen and the generator were turned off, and the sample was cooled to room temperature under argon flow for about 10 minutes. To further explore the nanotube growth at low temperatures, similar reactions were also performed using an electrical furnace. For graphene-decorated systems with about 5 nm or about 15 nm iron oxide nanoparticles, the synthesis temperature was varied between about 150-500° C. and about 300-500° C., respectively. Control experiments were done under similar conditions using the non-decorated graphene.

In addition, experiments with other catalyst nanoparticles, such as Au, amine-functionalized iron oxide nanoparticles, and Fe/Co mixture, separately deposited on graphene, were also performed under identical reaction conditions, which did not yield any CNT growth at such low temperatures. Higher temperatures (above 450° C.) were required for the generation of any tubular structures on the Au-graphene and Fe/Co-graphene samples. The preparation of the Au-graphene and Fe/Co-graphene composites are as follows. Graphene decoration with iron and cobalt nano-particles was performed as previously reported [54]. Fe/Co metal loading (about 2.5 wt. % of Fe and about 2.5 wt. % of Co) was added to carboxylated graphene sheets through impregnation. First, $Fe(NO_3)_3 \cdot 9H_2O$ and $Co(NO_3)_2 \cdot 6H_2O$ were dissolved separately in acetone with agitation. Graphene was then dispersed in acetone at about 0.5 mg/mL and the nitrate solutions were added to the mixture while bath sonicating for about 30 minutes. Acetone was evaporated while the final solution was heated to about 80° C. under continuous stirring. The graphene mixture was further dried overnight at about 100° C. Finally, the dried powders were calcinated in an oven at about 350° C. for about 3 hours [54].

The decoration of graphene with gold nano-particles was accomplished by modifying a previously published method [55]. Specifically, about 28 g of about 18%2 water was added to a vial, to which about 300 μL of about 50 mM $HAuCl_4$ (aq) (Aldrich, ACS reagent grade, greater than about 99.9% trace metals) and about 900 μL of about 50 mM $NaBH_4$ (aq) (Aldrich, 99%) were sequentially added while agitating for about 1 minute. The solution was then heated to about 100° C. for about 3 minutes and subsequently cooled to room temperature. Next, about 15 g of acetone were added to the vial. A graphene/hexane dispersion, which was prepared by dispersing about 5 mg of functionalized graphene in about 25 mL hexane (JT Baker, 95% n-hexane) by ultrasonication for about 1 hour, along with about 6 μL of dodecanethiol/hexane solution, was added to the solution; the vial was capped and shaken vigorously for about 1 minute. The liquid was then allowed to separate into a colorless bottom layer and a top layer containing the graphene and gold. The top layer was removed and dried at about 100° C. The RF reactions for both graphene mixtures (with Fe/Co or Au) were performed separately as described above.

1.1 Analytical Characterization Techniques

Transmission Electron Microscopy (TEM), Scanning Electron Microscopy (SEM), BET surface area analysis and thermo-gravimetrical analysis, were utilized to thoroughly characterize the decorated and the non-processed graphene before and after the RF reactions.

A JEOL field-emission transmission electron microscope, Model JEM-2100F, was used to collect high-resolution images. The samples were individually dispersed in isopropanol and gently sonicated for 1 hour for a homogenous dispersion. A few drops from each suspension were deposited on holey carbon-coated TEM grids, which were then air dried before imaging/analysis at 80 kV. Scanning Transmission Electron Microscopy (STEM) was also carried out by JEOL JEM-2100F at 80 kV to obtain High Angle Annular Dark Field (HAADF) images of the catalyst nano-particles present in the graphene sheets. X-ray energy dispersive spectroscopy (EDAX Corporation Pegasus 4040) enabled elemental analysis and mapping.

SEM analysis was conducted using a field emission scanning electron microscope, JSM-7000F (JEOL USA, Inc., Peabody, Mass.). The graphene samples before and after RF treatment at different temperatures were placed on the double-sided carbon tape which was attached to an aluminum pin. Elemental analysis in SEM was performed with EDAX Genesis EDS system.

Thermo-gravimetrical analyses were performed under Argon flow of 150 mL/min using the Mettler Toledo TGA/SDTA 851e system. Brunauer-Emmett-Teller (BET) surface area analyses were performed using a Micromeritics ASAP 2020 instrument by recording nitrogen adsorption/desorption isotherms at 77 K using a static volumetric technique.

2. Results and Discussions

The iron oxide-decorated graphene sheets were thoroughly characterized by scanning and transmission electron microscope (SEM/TEM). FIG. 1(a) and its inset provide SEM images of the decorated graphene (white arrows point to the iron oxide nanoparticles on the graphene surface). Low- and high-resolution mappings performed using SEM and TEM clearly indicate the presence of Fe, C, and O. Additionally, the Fe—K X-ray signals are present in the energy dispersive X-ray spectroscopy (EDS) analysis of the decorated graphene sheets as shown in FIGS. 1(b) and 1(g). TEM images of the decorated graphene sheets demonstrating a homogeneous diameter distribution of iron oxide nanoparticles are shown in FIG. 1(f). The diameter of the nanoparticles deposited on the graphene sheets was found to be about 4.5 nm (±0.5 nm). The inset in FIG. 1(f) shows the electron diffraction pattern of the graphene indicating a well-crystallized sample.

Figure 2:
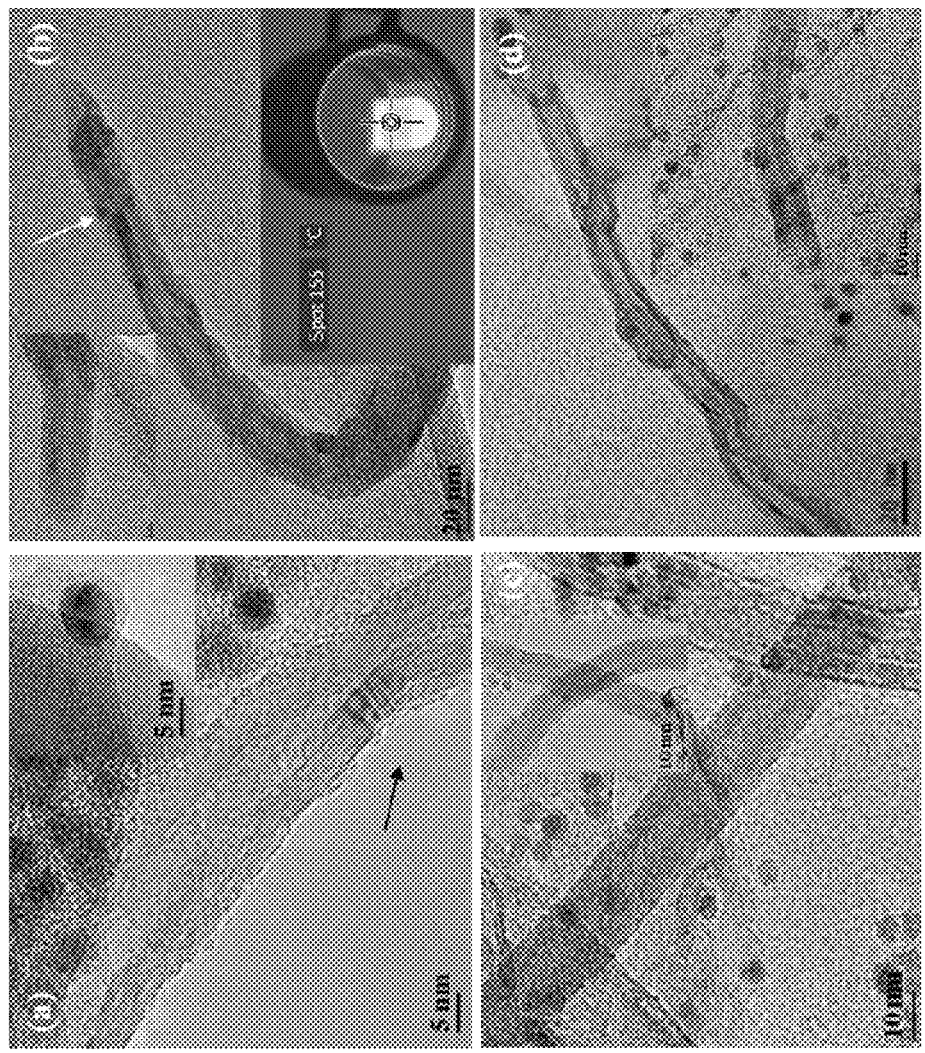
FIG. 2 shows (a): TEM image of the MWCNT synthesized in the RF-CVD at 150° C. (±5° C.) on the decorated graphene sheet, (b) (and its inset in the upper corner): low- and high-resolution TEM images of the MWCNTs grown on the decorated graphene sheet at 150° C. The scale in the inset of (b) is about 5 nm. The inset in the lower corner of FIG. 2 (b): Infrared camera image indicating the sample temperature (155° C.), (c) and (d) (and their insets): MWCNTs synthesized at 150° C. using a thermo-electric tube furnace.
Figure 3:
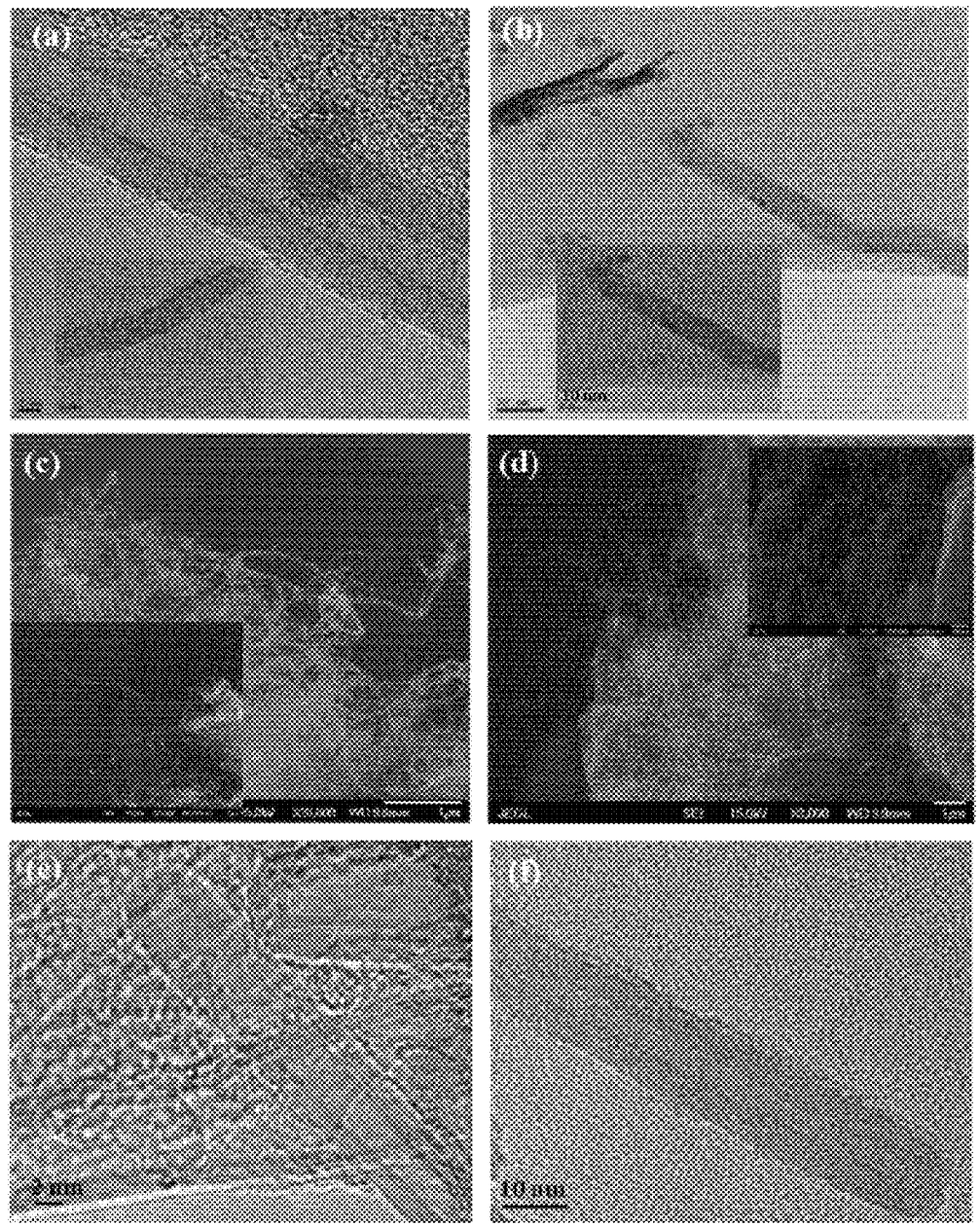
FIG. 3 shows (a) and (b) (and their insets): TEM images of the MWCNTs synthesized on the decorated graphene sheets at 200° C. in the thermo-electric oven, (c) and (d) (and their insets): SEM images at different resolutions of the CNTs synthesized under argon/hydrogen environment at 200° C. using the RF-CVD, (e) and (f): High- and low-resolution TEM images of the MWCNTs observed on the graphene sheets after RF treatment at 200° C., respectively.

CNTs were synthesized on graphene surfaces at temperatures as low as about 150° C. (±5° C.) in the RF generator, using only argon/hydrogen mixture without adding a hydrocarbon source. Low- and high-resolution TEM images of the MWCNTs synthesized on the iron oxide-decorated graphene sheets are shown in FIGS. 2(a) and 2(b). The outer and inner diameters of the nanotubes were found to vary between about 16-20 nm and about 3-6 nm, respectively. These values are comparable to the ones reported by Vohs et al., who synthesized nanotubes by the decomposition of $CCl_4$ at very low temperatures [13]. FIG. 2(a) shows a MWCNT with diameter of about 16.6 nm grown on the edge of the decorated graphene sheet. A few of the iron oxide nanoparticles were found to be entrapped within the graphene layers. This observation could indicate that the nanoparticles had a strong catalytic activity but failed to produce nanotubes. Moreover, it may suggest that the nanotube growth process evolves first by the generation of graphitic layers around the metal nanoclusters, which ultimately develop into tubular shapes. It was also observed that the surface of some CNTs was decorated with iron oxide nanoparticles, which are indicated by the arrow in FIG. 2(b). Additionally, a few bends and ripples were detected along the nanotube walls, indicated by arrows in FIG. 2(a), similar to those observed by Shang et al., when synthesizing vertically aligned CNTs at 370° C. [5]. These structural defects and the low-level graphitization may be due to the stress on the walls occurring at low synthesis temperatures; studies have shown that such defects may be removed by annealing CNTs at higher temperatures, resulting in straighter tubes with higher crystallinity [5, 41]. The inset in FIG. 2(b) shows an image taken with the infrared camera indicating the sample temperature (about 155° C.). Additional reactions were also performed at about 150° C. by using a thermo-electric tube furnace (under the same conditions as in RF-CVD) to confirm nanotube formation at two different heating methods (inductive and resistive thermal heating). TEM images of the MWCNTs grown at about 150° C. on the decorated graphene sheets are shown in FIGS. 2(c) and 2(d). At temperatures higher than about 150° C., for example at about 200° C., similar CNT growth was observed, as shown in FIGS. 3(a) and 3(b).

High-yield CNTs were synthesized on the decorated graphene sheets at about 200° C. using the RF-CVD under identical conditions. A temperature increase by about 50° C. resulted in significantly higher CNT-formation. FIGS. 3(c) and 3(d) (and their insets) present SEM images at different magnifications of the nanotube bundles. The high- and low-resolution TEM images of the MWCNTs observed on the graphene sheet after RF treatment at about 200° C. are shown in FIGS. 3(e) and 3(f). A high percentage of nanotubes were found to have an approximate about 7 nm (±0.5 nm) outer diameter and an inner diameter of about 3-4 nm, which are smaller than the outer and inner diameter of the nanotubes synthesized by others at low temperatures [10]. Nevertheless, the remaining of the close-ended nanotubes, as revealed by TEM analysis, has diameters ranging from about 10 nm to about 15 nm, as shown in FIG. 3(f).

Figure 4:
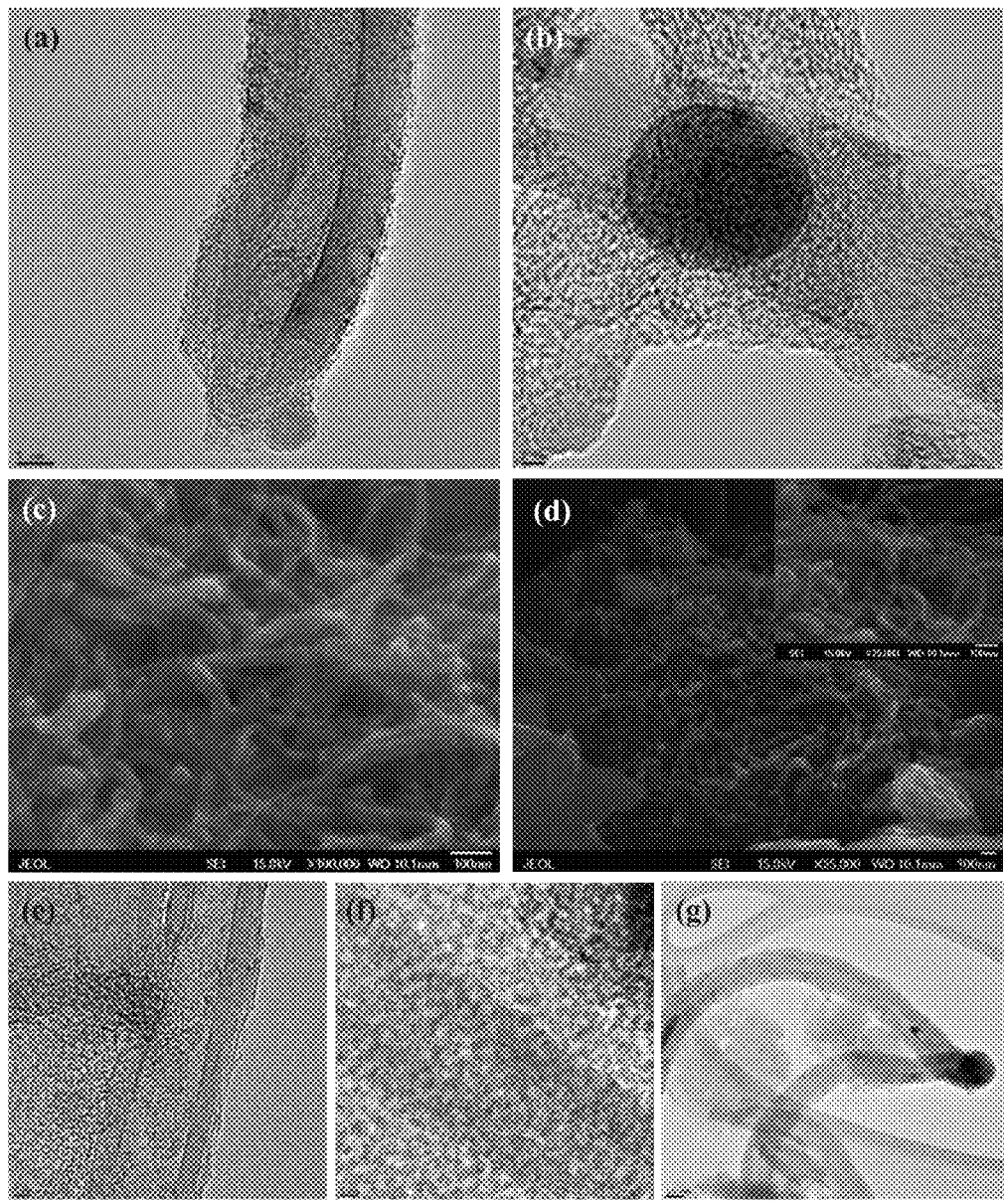
FIG. 4 shows (a) and (b): TEM images of the MWCNTs synthesized at 300° C. using the RF-CVD under argon/hydrogen environment, (c) and (d): SEM images at different resolutions of the high-yield CNTs grown on the decorated graphene samples at 500° C., (e)-(g): High- and low-resolution TEM images of the crystalline CNTs found on the graphene sheets after the RF treatment at 500° C. The scale bar in (e) and (f) is 2 nm, whereas the scale bar in (g) it is 20 nm.

The reaction temperature was further increased to about 300° C., and the growth of tubular structures was observed as presented in FIGS. 4(a) and 4(b). A few of the TEM images, as shown in FIG. 4(b), indicated the presence of large catalyst nanoparticles (with diameters between about 8-12 nm), which could be due to a coalescence of the smaller particles (about 5 nm diameter) when subjected to higher temperatures (about 300° C.), under the hydrogen flow. It was previously shown that, during CNT growth, an increase in the hydrogen level yielded larger metallic nanoparticles, as they agglomerated on the catalyst support, resulting in nanotubes with larger diameters [42]. The diameter of MWCNTs was found to be approximately 20 nm (±2 nm). As the temperature was increased to about 500° C., a higher growth of tubular structures was observed, as shown in the SEM images (FIGS. 4(c) and 4(d)). TEM observations primarily indicated the presence of highly crystalline MWCNTs with about 20 nm outer diameters and approximately 8.5 nm inner diameters. FIGS. 4(e)-4(g) demonstrate the high- and low-resolution TEM images of the uniform MWCNTs synthesized at about 500° C. on the decorated graphene sheets. Furthermore, microscopic analyses revealed that the yield of CNTs increased as the temperature increased from about 150-500° C., which has also been observed by others [12].

An important observation is that the graphene sheets (controls) that were not decorated with iron oxide nanoparticles did not produce any tubular structures, indicating the significance of the highly active Fe catalyst to initiate CNT growth at such low temperatures. The TEM and SEM images of the control graphenes are shown FIGS. 6(a)-6(d). It seems that, even at a very low synthesis temperature (below about 300° C.), the catalyst nanoparticles in intimate contact with graphene sheets are highly reactive initiating the conversion of graphene into nanotubes [20]. Mora et al. reported that low-temperature nanotube growth is limited by a number of factors: catalytic decomposition of the carbon source, which depends on the type and size of the catalyst nanoparticle; residual oxygen present on the catalyst nanoparticles; the lowest temperature sufficient to decompose the feedstock; and the activity of the carbon source [41].

Figure 5:
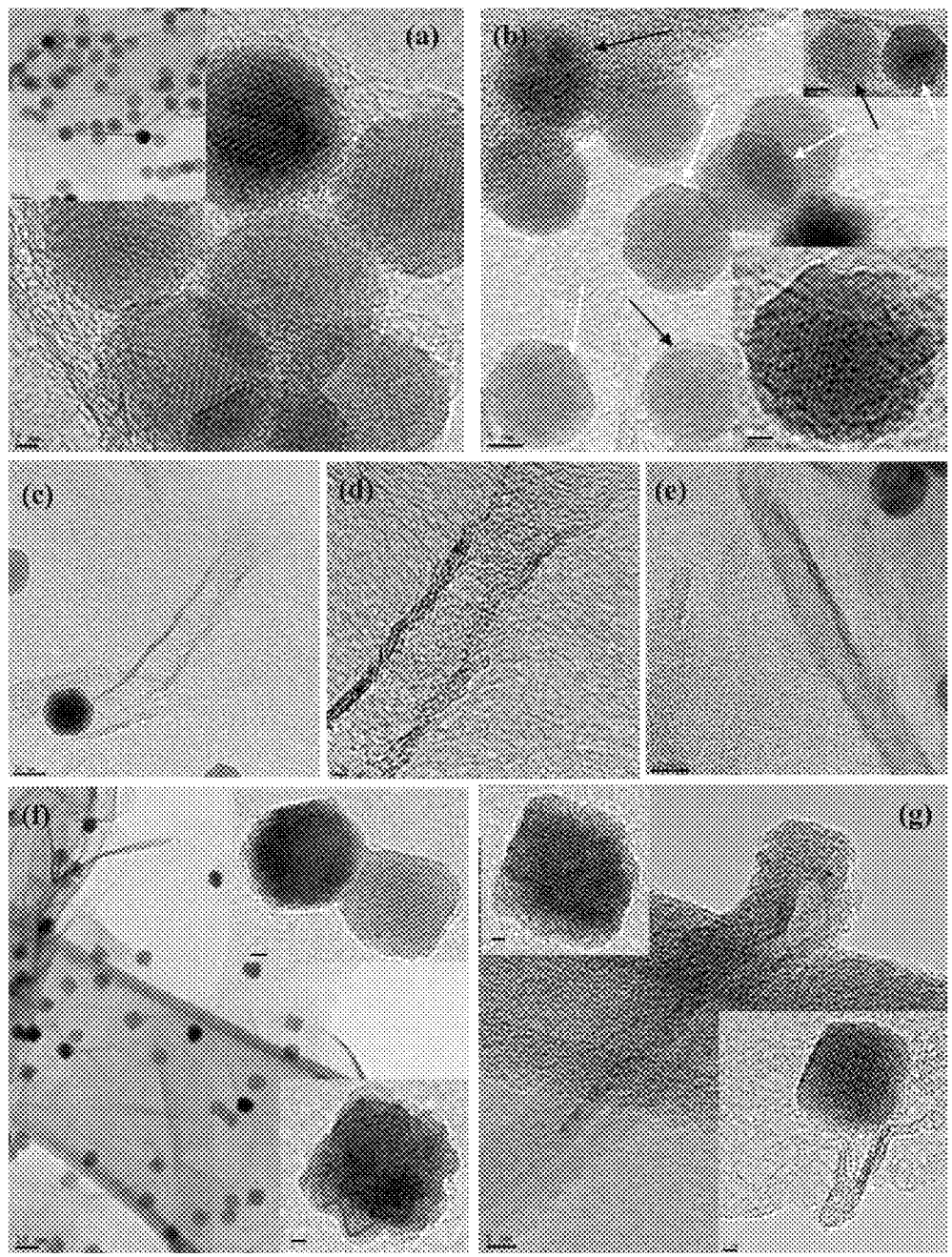
FIG. 5 shows (a) and its inset: High and low resolution TEM images of the 15 nm iron oxide nanoparticles decorating the graphene sheets after the RF treatment at 300° C., (b) and its insets: TEM images of the graphene-decorated samples after the RF treatment at 400° C. Black and white arrows indicate the presence of spherical and non-spherical (with edges) iron oxide nanoparticles, respectively, (c)-(e): TEM images of MWCNTs after the samples were heated at 400° C. under argon/hydrogen environment, (f) and (g): TEM images of the decorated graphene samples RF-treated at 500° C., indicating the presence of iron oxide nanoparticles with non-spherical, square-like shapes and soft edges.
Figure 8:
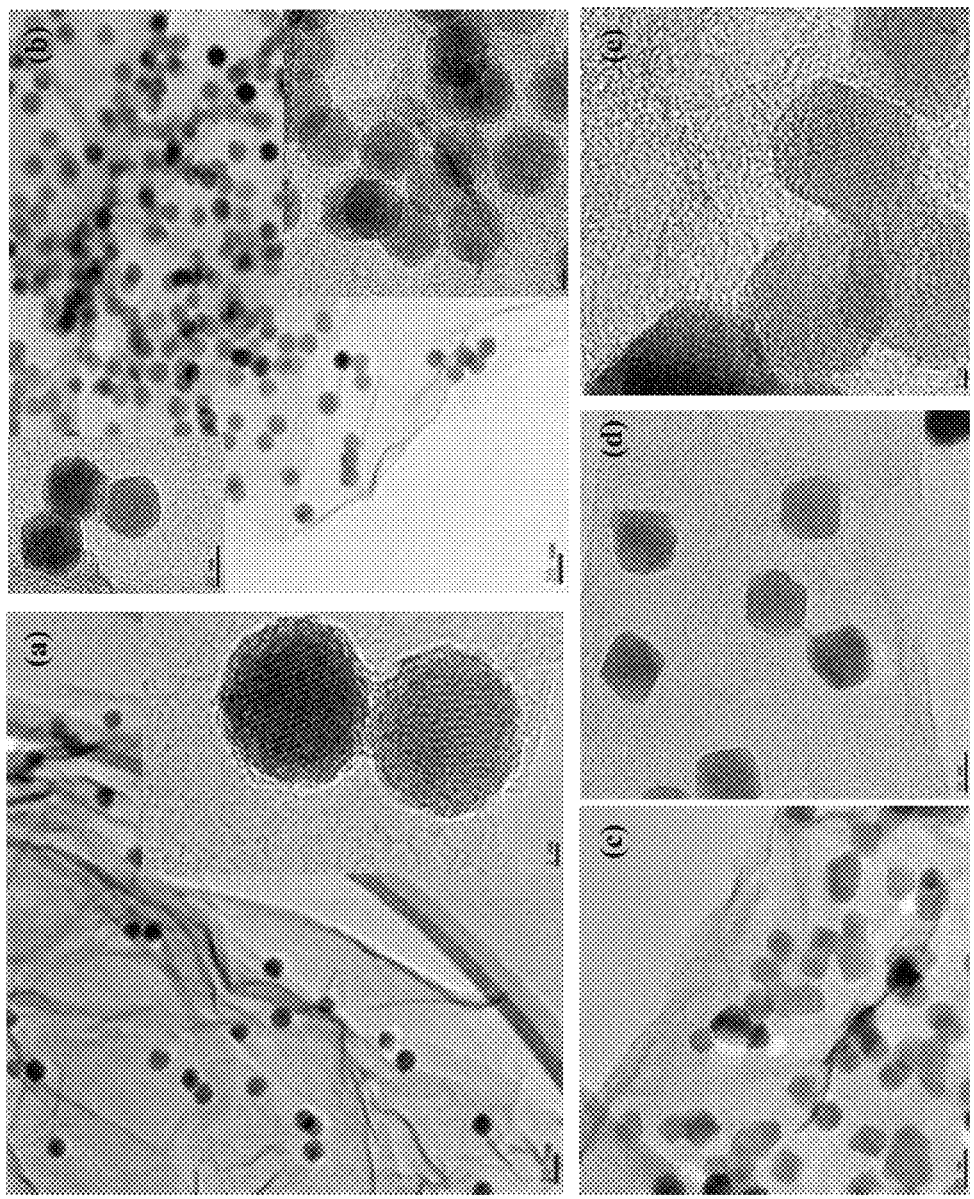
FIG. 8 shows (a) and its inset: low and high resolution TEM images of the 15 nm spherical nanoparticles decorating the graphene sheets after the 300° C. treatment, (b) and insets: The decorated graphene samples with a mixture of spherical and non-spherical nanoparticles after the RF-treatment at 400° C. for 30 minutes, (c)-(e): TEM images of the iron oxide nanoparticles with non-spherical and square-like shapes after the RF-treatment at 500° C.

In order to further understand the influence of the nanoparticles' size on their catalytic role, the functionalized graphene sheets were decorated with iron oxide nanoparticles with a diameter of about 15 nm and exposed to similar experimental heating conditions under argon/hydrogen environments at about 300° C., about 400° C., and about 500° C. After a thorough TEM analysis, no CNT growth was detected at about 300° C. The homogenously dispersed nanoparticles were mostly found in between the graphene sheets or covered by the graphitic layers. FIG. 5(a) and its inset show the high and low resolution TEM images of the spherical nanoparticles nicely decorating the graphene sheets. Additional representative TEM images of the 15 nm iron oxide nanoparticles resting in between the graphene layers after the RF treatment at 300° C. are shown in FIG. 8(a). Next, as the temperature was increased to 400° C., a change in the morphological properties of the nanoparticles was noticed. FIG. 5 (b) and its insets show TEM images of the graphene-decorated samples after the RF treatment at about 400° C. for about 30 minutes. The TEM analysis indicated the presence of a mixture of spherical, illustrated by black arrows in FIG. 5(b), and non-spherical iron oxide nanoparticles with diameters of about 15 nm (formation of edges is shown by white arrows) often covered by the graphene layers. Unlike the results obtained at lower temperatures (below about 400° C.), the TEM images shown in FIGS. 5(c)-5(e) demonstrate the formation of non-crystalline MWCNTs at about 400° C., with outer diameters between about 9-11 nm.

The morphological properties of the 15 nm iron oxide nanoparticles were further affected after a heat treatment at about 500° C. FIGS. 5(f) and 5(g) and their insets show representative TEM images of the decorated graphene samples RF-treated at about 500° C. A thorough TEM analysis demonstrated the presence of non-spherical nanoparticles with more edges (about 6 edges) and square-like shapes (inset in FIG. 5 (g)), rather than the spherical ones which were observed at lower temperatures (below about 400° C.). A few non-crystalline, short MWCNTs along with graphene-covered nanoparticles were also found. The inset in FIG. 5(g) shows the start of a tubular formation from a square-shaped nanoparticle. Some of the nanoparticles were found to have soft edges at about 400° C. and about 500° C., as shown in the insets of FIGS. 5(b) and 5(f), respectively. The formation of a very thin, disordered layer (few nanometers) has also been observed by Behrens et al. over Cu nanoparticles in a high-performance CuZn catalyst, using aberration-corrected high resolution TEM (HRTEM) analysis [43]. Furthermore, they concluded that undistorted pure Cu was quite inactive, while only a small fraction of the catalyst surface actually contributed to the catalyst activity [43]. Therefore, similar active sites, which could be present in the non-spherical iron oxide nanoparticles decorating the graphene sheets, may enable and enhance their catalytic activity. Additional TEM images of the decorated graphene samples after they were heated at about 400° C. and about 500° C. in the RF generator are shown in FIGS. 8(b)-8(e). The spherical and undistorted about 15 nm iron oxide nanoparticles present on graphene sheets at about 300° C. did not yield any nanotube formation, whereas, at higher temperatures (e.g., about 400° C. or higher), changes in the nanoparticles' morphology led to the formation of active sites and the beginning of CNT growth. On the other hand, for the graphene sheets decorated with the 5 nm nanoparticles, nanotube growth (even though at a low yield) was detected at temperatures as low as about 150° C. It is believed that this phenomenon occurs partly due to the fact that nanoparticles of the same type with various dimensions are catalytically active at different temperatures.

Furthermore, experiments performed under identical reaction conditions with other catalyst nanoparticles, such as Au, amine-functionalized iron oxide nanoparticles, and Fe/Co mixture, separately deposited on graphene, did not yield any CNT growth at such low temperatures. It was also observed that the surface chemistry of the iron oxide nanoparticles plays a very important role. For example, amine-functionalized iron oxide nanoparticles with a diameter of about 25 nm did not show any evidence of CNT growth at temperatures lower than about 400° C. Furthermore, higher temperatures (greater than about 450° C.) were required for the generation of any tubular structures on the Au-graphene and Fe/Co-graphene samples.

The BET surface area of the as-purchased graphene flakes and the oxidized functionalized product were found to be about 565 $m^2/g$ and about 419 $m^2/g$, respectively. This slight decrease in the surface area could be due to the functional groups present in the modified graphene sheets resulting in more particle-to-particle interactions. After the functionalization process, the as-purchased "fluffy" graphene flakes are transformed into more granular graphitic powders. In this case, the graphene sheets are closely stacked together due to the functional groups aiding into a slightly lower surface area. In the as-purchased graphene, the dominant particle-to-particle interaction would be very weak Van der Waals forces, however once the graphene is treated more polar surfaces are present increasing the attraction between particles of functionalized graphene.

The BET surface area of the decorated graphene and the graphene-metal/nanotube composites (the one synthesized at about 500° C.) were found to be around about 205 $m^2/g$ and about 245 $m^2/g$, respectively. The higher surface area present in the final nano-composites is possibly attributed to the presence of MWCNTs synthesized on the decorated graphene sheets. A decrease in the surface area was noticed as the functionalized graphene sheets were decorated with iron nano-particles. In this case, the nano-particles may possibly act as "cross-linkers" between the graphene sheets by increasing the interaction between the graphitic layers and thus decreasing the overall surface area.

Figure 6:
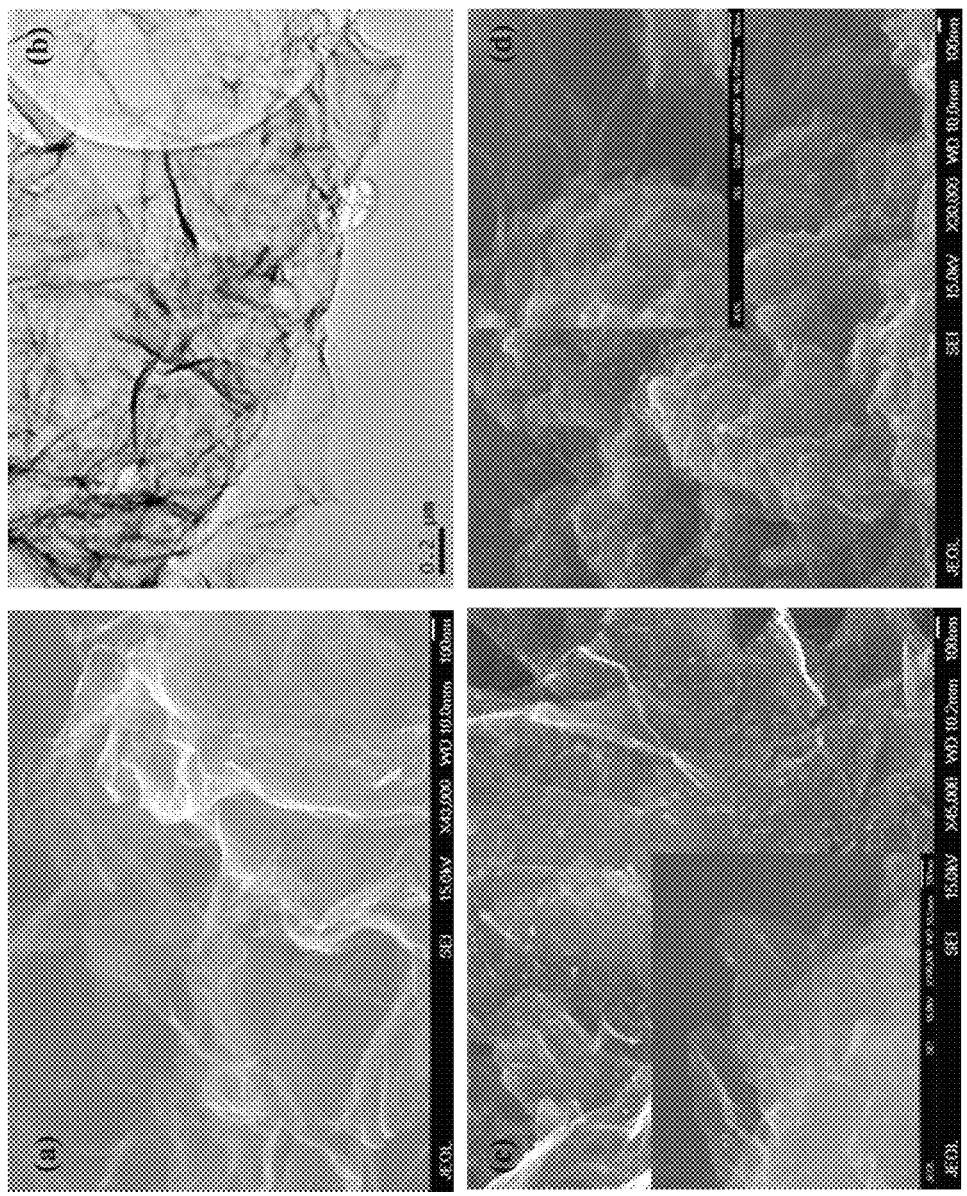
FIG. 6 shows (a) and (b): SEM and TEM images of the non-processed graphene, respectively, (c) and inset: SEM image of the Au-decorated graphene, (d) and inset: Low- and high-resolution SEM images of the CNTs synthesized on the Fe/Co-decorated graphene at 600° C., respectively.

FIGS. 6(a) and 6(b) show the SEM and TEM images of the non-processed graphene indicating the presence of large and transparent sheets with very few layers. SEM images of the Au-decorated graphene sheets are shown in FIG. 6(c) and its inset. The Au-nanoparticles (seen as the white dots in the image) were homogenously deposited on the graphene sheet before the RF reactions. No CNT formation was detected at temperatures lower than about 500° C. FIG. 6(d) and its inset show the low- and high-resolution SEM images of the Fe/Co-decorated graphene after the RF reaction at about 600° C. The SEM analyses demonstrated the presence of high-yield CNTs on the decorated graphene surfaces.

Figure 7:
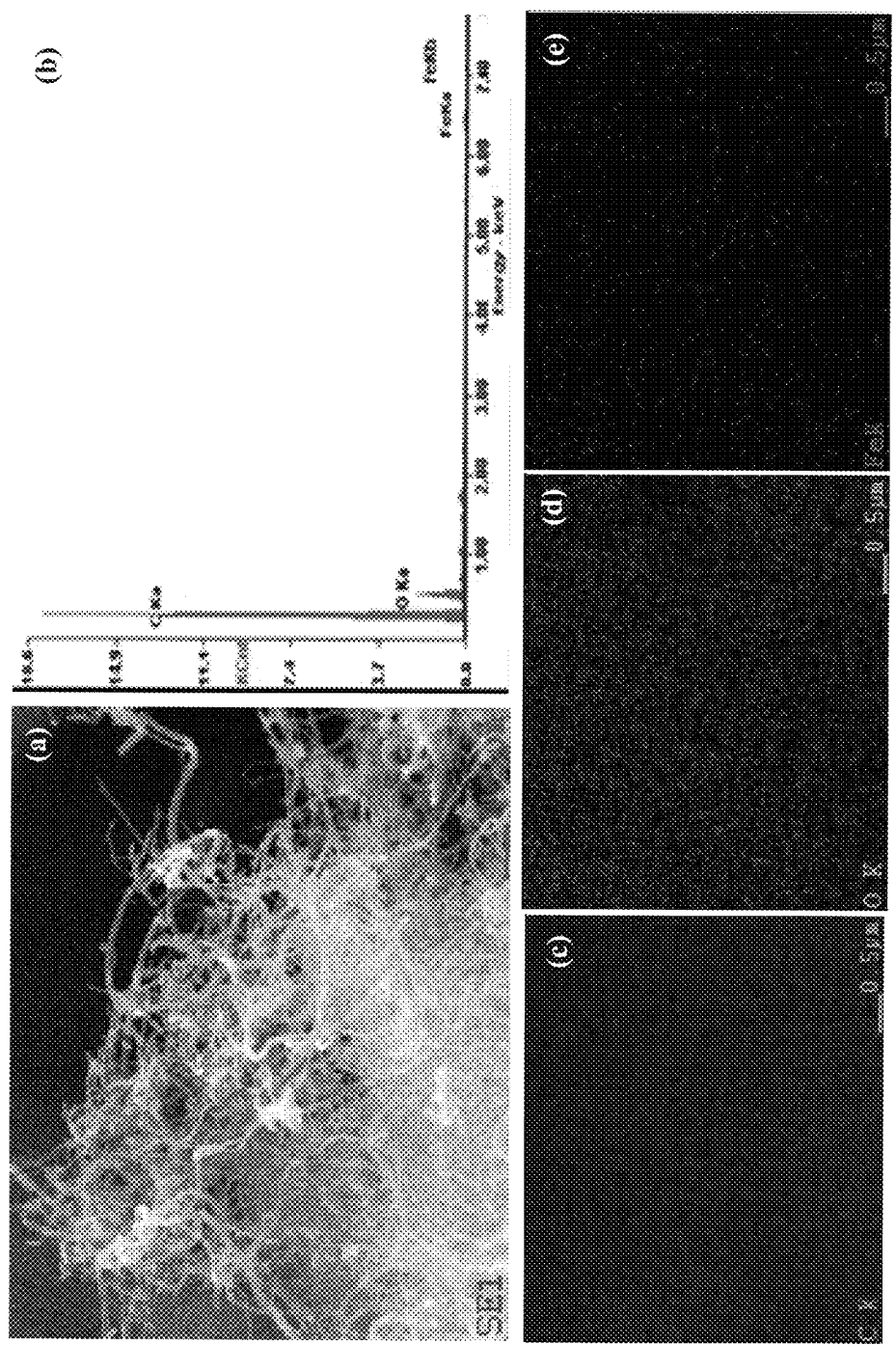
FIG. 7 shows (a)-(e): SEM/EDS analysis (maps) of the CNTs synthesized on the iron oxide decorated graphene sheets at 200° C. (in the RF generator) indicating the presence of C, O, and Fe.

FIG. 7(a) shows the SEM image of the high-yield CNTs grown at about 200° C. on the graphene sheets decorated with the 5 nm iron oxide nano-particles. The SEM/EDS analysis (maps) clearly illustrates the presence of C, O, and Fe, as shown in FIGS. 7(a)-7(e).

The diameter and/or the type of functional groups present on the nanoparticles may be some of the factors allowing catalyst reduction under hydrogen by improving the accessibility of hydrogen molecules to the internal oxide layer and hence enabling the CNT formation at temperatures as low as 150° C. [41]. Ziebro et al. reported that at lower temperatures carbon nanostructures, such as MWCNTs and carbon nano-fibers, grow on smaller catalyst nanoparticles compared to high-temperature reactions [15]. Therefore, the mono-metallic iron oxide catalyst (with about 5 nm diameter particles) deposited on the graphene sheets plays a crucial catalytic role in the CNT formation. These catalytic responses are yet to be fully understood. It is believed that a possible combination of effects or processes could be responsible for these findings. The most important consideration is the catalytic activity of the metallic nanoparticles and the role that their size plays. Other factors include the oxidation state of the metal surface and the fact that the reduction process is possibly related to the size and the oxidation level of the nanoparticles.

Hydrogen is often used to reduce various catalyst systems prior to CNT growth as it has a strong effect on the catalyst's efficiency and the morphological properties of the resulting nanotubes. A mixture of hydrogen and methane gases was previously used to synthesize single-walled carbon nanotubes on the Fe—Mo/MgO catalyst system under RF heating [42]. It was observed that an increase in the hydrogen level induces an increase in the synthesis yield and catalyst efficiency. During the reduction process, hydrogen has a strong effect on the morphological properties of the catalyst (Fe/Mo) nanoparticles resulting in a faster reduction to a metallic state[42].

Generally, it has been observed that many of the catalyst systems require high-temperature reduction before initiating CNT growth [41, 42]. However, the Fe-based catalyst system used in this example did not seem to necessitate such conditions. It has been previously shown that reducing the iron oxide nanoparticles is rather difficult due to the fact that, once hydrogen reaches the surface of the oxide, it initiates a fast nucleation and at the same time it forms a thin, dense layer of metal[44]. The latter was found to decrease the active interface area and slow the reduction process [44]. Pineau et al. have reported that the hydrogen reduction of hematite with grain size of about 1-2 μm at temperatures under 570° C. occurs in two steps: (a) $Fe_2O_3 \rightarrow Fe_3O_4$ and (b) $Fe_3O_4 \rightarrow Fe$ [44, 45]. It has also been reported that different gas mixtures present in the reduction process yield various values of activation energy (Ea) [45]. Taking into consideration the same conditions used in the experimental setup (about 67% hydrogen, in a hydrogen/argon environment), values of Ea for a temperature range of about 290-480° C. were reported to be about 124 kJ/mol for the hydrogen reduction of $Fe_2O_3$ into $Fe_3O_4$ and about 172 kJ/mol for the reduction of $Fe_3O_4$ into Fe [44-46].

Although it was very difficult to evaluate and thoroughly prove the reduction of the 5 nm iron oxide nanoparticles deposited on the graphene sheets at such low temperatures, the fact that CNT growth takes place under two different heating methods makes us believe that a reduction or partial reduction of the nanoparticles occurred. For various iron oxide species, the activation energy for temperatures lower than about 250° C. increases significantly (higher than about 200 kJ/mol depending on the percentage of hydrogen in the reduction environment) [45, 47]. Therefore, in our iron oxide-graphene system, graphene may influence the process and the kinetics by which the metal oxide nanoparticles are reduced, thereby resulting in a lower temperature reduction and a higher catalytic activation required for CNT formation [20]. Other groups have reported that, while the hydrogen migration (or hopping) on the surface of carbon-based materials is energetically difficult, in the presence of a catalyst, this process becomes kinetically favorable [48-51]. It is believed that a catalyst is necessary in assisting the transport of hydrogen over the graphene surface, conferring a catalytic and thermodynamic effect and hence lowering its migration barrier [48, 51]. It is possible that graphene plays a double role-acting as a catalyst support and as a carbon source, as previously observed for the Au-graphene system [20].

To further support the findings, identical reactions were also conducted inside a furnace in a thermogravimetrical instrument under argon-only environment at about 150° C., and no CNTs were detected by TEM. This significant finding indicates that, in this case, hydrogen is necessary for the catalyst reduction and hence CNT growth at low temperatures. It is also believed that iron oxide nanoparticles preferentially attach at the side of structural defects in the graphene layers; therefore, the missing structural C—C bonds may also explain the lower temperature required for the conversion of the 2D graphene structure into the 1D nano-tubular morphology [52]. A thorough study is ongoing to further understand the effects of graphene and the type/size of the catalyst nanoparticle on the nucleation and growth of CNTs under these particular reaction conditions.

This is a facile, economical/low cost, and easily scalable technique in which only argon and hydrogen gases are employed (no hydrocarbon source) at very low temperatures. Using graphene as the only support and no other substrates (such as MgO, silica zeolite, or $CaCO_3$) makes the nanotube growth very practical, eliminating the need for removal of support using various acid treatments, which often cause numerous defects in the resulting carbon structures [6, 7, 9, 15, 20]. Additionally, the preparation of such complex catalyst systems is very time-consuming.

3. Conclusions

In one aspect, the invention recites, among other things, a synthesis method of CNTs at temperatures as low as 150° C. (±5° C.) on few-layer graphene sheets decorated with about 5 nm iron oxide nanoparticles under argon/hydrogen environment. This is the lowest temperature reported to date for the growth of CNTs on graphene sheets without addition of any hydrocarbons. Microscopic analysis indicated that the nanotube deposition after the RF treatment was much higher as the synthesis temperature was increased from about 150-500° C. CNT growth was also observed by TEM when reactions were carried out in an electrical furnace at about 150° C. The graphene sheets decorated with about 15 nm catalyst particles did not yield any nanotube formation at temperatures below about 400° C. This low temperature growth technique provides a significant and promising approach for the integration of such novel nano-composites (CNT/graphene/metal) in a wide range of promising applications, varying from photovoltaic devices to sensing and drug delivery.

This low-temperature, facile technique opens the door to a wide range of applications for these novel nanoparticle/graphene-nanotube systems in areas varying from nanoelectronics and energy harvesting to bio-nano. This multi-level and multicomponent nano-system can be used in a number of applications that include, but not limited to, sensing, tissue engineering, nanoelectronics, photovoltaic and energy harvesting devices, energy storage, fuel cell membranes, catalysis of various cases, advanced composites, surface science-oil and water/ice mitigation, filtration, electrochemistry.

Certain embodiments of the present invention, among other things, have at least the following advantages. This is a facile, economical/low cost, and easily scalable technique in which only argon and hydrogen gases are employed (no hydrocarbon source) at very low temperatures, which makes the nanotube growth very inexpensive. One-step process is used for the decoration of graphene with iron oxide nanoparticles. Using graphene as the only support and no other substrates (such as MgO, silica zeolite, or $CaCO_3$) makes the nanotube growth very practical, eliminating the need for removal of support using various acid treatments, which often cause numerous defects in the resulting carbon structures. Additionally, the preparation of such complex catalyst systems is very time-consuming. Since CMOS devices are generally fabricated at temperatures below 400° C., lowering the CNT growth temperature is imperative for their incorporation in hybrid, complex electronic devices.

The foregoing description of the exemplary embodiments of the invention has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the invention and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims as well as the disclosure including drawings.

LIST OF REFERENCES

[1]. S. Iijima, Nature 254 (1991) 6348.
[2]. A. Javey, H. Kim, M. Brink, Q. Wang, A. Ural, J. Guo, P. McIntyre, P. McEuen, M. Lundstrom, H. Dai, Nature Materials 1 (2002) 241.
[3]. J. Li, Q. Ye, A. Cassell, H. T. Ng, R. Stevens, J. Han. M. Meyyappan, Appl. Phys. Lett. 82 (2003) 2491.
[4]. E. Dervishi, Z. Li, Y. Xu, V. Saini, A. R. Biris, D. Lupu, A. S. Biris, Particulate Science and Technology 27 (2009) 107.
[5]. N. G. Shang, Y. Y. Tan, V. Stolojan, P. Papakonstantinou, S. R. P. Silva, Nanotechnology 21 (2010) 505604.
[6]. E. Dervishi, Z. Li, F. Watanabe, Y. Xu, V. Saini, A. R. Biris, A. S. Biris, J. Mater. Chem. 19 (2009) 3004.
[7]. E. Dervishi, Z. Li, A. R. Biris, D. Lupu, S. Trigwell, A. S. Biris, Chem. Mater. 19 (2007) 179.
[8]. A. R. Biris, D. Lupu, A. Grüneis, P. Ayala, M. H. Rummel, T. Pichler, Z. Li, I. Misan, E. Dervishi, Y. Xu, A. S. Biris, Chemistry of Materials 20 (2008) 3466.
[9]. E. Dervishi, Z. Li, Y. Xu, V. Saini, F. Watanabe, A. R. Biris, A. Bonpain, J. J. Garbay, A. Meriet, M. Richard, A. S. Biris, Particulate Science and Technology: An International Journal, 27 (2009) 222.
[10]. R. Sharma, Z. Iqbal, Appl. Phys. Lett. 84 (2004) 990.
[11]. W. Wang, J. Y. Huang, D. Z. Wang, Z. F. Ren, Carbon 43 (2005) 1317.
[12]. W. Wang, B. Poudel, D. Z. Wang, Z. F. Ren, J. Am. Chem. Soc. 127 (2005) 18018.
[13]. J. K. Vohs, J. J. Brege, J. E. Raymond, A. E. Brown, G. L. Williams, B. D. Fahlman, J. Am. Chem. Soc. 126 (2004) 9936.
[14]. X. Wang, J. Lu, Y. Xie, G. Du, Q. Guo, S. Zhang, J. Phys. Chem. B 106 (2002) 933.
[15]. J. Ziebro, I. Lukasiewicz, E. Borowiak-Palen, B. Michalkiewicz, Nanotechnology 2010 (2010) 145308.
[16]. X. Cao, Q. He, W. Shi, B. Li, Z. Zeng, Y. Shi, Q. Yan, H. Zhang, Small 2011 (2011) 1199.
[17]. D. P. Hunley, S. L. Johnson, J. K. Stieha, A. Sundararajan, A. T. Meacham, I. N. Ivanov, D. R. Strachan, ACS Nano 5 (2011) 6403.
[18]. J. M. C. Moreno, M. Yoshimura, J. Am. Chem. Soc. 123 (2001) 741.
[19]. D. Takagi, Y. Kobayashi, Y. Homma, J. Am. Chem. Soc. 131 (2009) 6922.
[20]. E. Dervishi, S. Bourdo, J. A. Driver, F. Watanabe, A. R. Biris, A. Ghosh, B. Berry, V. Saini, A. S. Biris, ACS Nano 2012 (2012) 501.
[21]. Y. Lin, D. W. Bagget, J. W. Kim, E. J. Siochi, J. W. Connell, ACS Appl. Mater. Interfaces 3 (2011) 1652.
[22]. L. Ren, S. Huang, W. Fan, T. Liu, App. Surf. Sci. 258 (2011) 1132.
[23]. Y. Xue, H. Chen, D. Yu, S. Wang, M. Yardeni, Q. Dai, M. Guo, Y. Liu, F. Lu, J. L. Dai, Chem. Commun. 47 (2011) 11689.
[24]. J. Liang, Y. Huang, J. Oh, M. Kozlov, D. Sui, S. Fang, R. H. Baughman, Y. Ma, Y. Chen, Adv. Funct. Mater. 21 (2011) 3778.
[25]. X. Li, X. Huang, D. Liu, X. Wang, S. Song, L. Zhou, H. Zhang, J. Phys. Chem. C 115 (2011) 21567.
[26]. M. Zhang, D. Lei, X. Yin, L. Chen, Q. Li, Y. Wang, T. Wang, J. Mater. Chem. 20 (2010) 5538.
[27]. M. Liu, C. Chen, J. Hu, X. Wu, X. Wang, J. Phys. Chem. C 115 (2011) 25234.
[28]. J. Zhu, S. Wei, H. Gu, S. B. Rapole, Q. Wang, Z. Luo, N. Haldoaarachchige, D. P. Young, Z. Guo, Environ. Sci. Technol. 46 (2012) 977.
[29]. T. Viswanathan, G. Gunawan, S. Bourdo, V. Saini, J. Moran, L. Pack, S. Owen, Journal of Macromolecular Science, Part A: Pure and Applied Chemistry 48 (2011) 348.
[30]. X. L. Wu, L. Wang, C. L. Chen, A. W. Xu, X. K. Wang, J. Mater. Chem. 21 (2011) 17353.
[31]. Q. Wu, G. Zhao, C. Feng, C. Wang, Z. Wang, J. Chromatogr. A 1218 (2011) 7936.
[32]. G. Zhao, S. Song, C. Wang, Q. Wu, Z. Wang, Analytica Chimica Acta 708 (2011) 155.
[33]. X. Li, X. Huang, D. Liu, X. Wang, S. Song, L. Zhou, H. Zhang, J. Phys. Chem. C 115 (2011) 21567.
[34]. H.-P. Cong, J.-J. He, Y. Lu, S.-H. Yu, Small 6 (2010) 169.
[35]. K. Zhou, Y. Zhu, X. Yang, C. Li, Electroanalysis 23 (2011) 862.
[36]. A. R. Biris, M. Mahmood, M. D. Lazar, E. Dervishi, F. Watanabe, T. Mustafa, G. Baciut, M. Baciut, S. Bran, S. Ali, A. S. Biris, J. Phys. Chem. C 115 (2011) 18967.
[37]. S. Pruneanu, F. Pogacean, A. R. Biris, S. Ardelean, V. Canpean, G. Blanita, E. Dervishi, A. S. Biris, J. Phys. Chem. C 115 (2011) 23387.
[38]. A. Yu, H. W. Park, A. Davies, D. C. Higgins, Z. Chen, X. Xiao, J. Phys. Chem. Lett. 2 (2011) 1855.
[39]. J. Su, M. Cao, L. Ren, C. Hu, J. Phys. Chem. C 115 (2011) 14469.
[40]. M. L. Chen, C. Y. Park, J. G. Choi, W. C. Oh, Journal of the Korean Ceramic Society 48 (2011) 147.

[41]. E. Mora, J. M. Pigos, F. Ding, B. I. Yakobson, A. R. Harutyunyan, J. Am. Chem. Soc. 130 (2008) 11840.
[42]. A. R. Biris, Z. Li, E. Dervishi, D. Lupu, Y. Xu, V. Saini, F. Watanabe, A. S. Biris, Physics Letters A 372 (2008) 3051.
[43]. M. Behrens, F. Studt, I. Kasatkin, S. Kühl, M. Hävecker, F. Abild-Pedersen, S. Zander, F. Girgsdies, P. Kurr, B. L. Kniep, M. Tovar, R. W. Fischer, J. K. Norskov, R. Schlogl, Science 336 (2012) 893.
[44]. A. Pineau, N. Kanari, I. Gaballah, Thermochimica Acta 447 (2006) 89.
[45]. A. Pineau, N. Kanari, I. Gaballah, Thermochimica Acta 456 (2007) 75.
[46]. O. J. Wimmers, P. Arnoldy, J. A. Moulijn, J. Phys. Chem. 90 (1986) 1331.
[47]. G. Munteanu, L. Ilieva, D. Andreeva, Thermochim. Acta 291 (1997) 171.
[48]. S. Han, H. Kim, N. Park, J. Phys. Chem. C 115 (2011) 24696.
[49]. L. Chen, G. Pez, A. C. Cooper, H. Cheng, J. Phys.: Condens. Matter. 20 (2008) 064223.
[50]. Y. Zhang, Z. Li, P. Kim, L. Zhang, C. Zhou, ACS Nano 6 (2012) 126.
[51]. S. S. Han, H. Jung, D. H. Jung, S. H. Choi, N. Park, Physical Review B 85 (2012) 155408.
[52]. M. Kayanuma, U. Nagashima, H. Nishihara, T. Kyotani, H. Ogawa, Chemical Physics Letters 495 (2010) 251.
[53]. E. Dervishi, A. R. Biris, J. A. Driver, F. Watanabe, S. Bourdo, A. S. Biris, Journal of Catalysis, 299 (2013) 307.
[54]. V. M. Sivakumar, A. Z. Abdullah, A. R. Mohamed, S. P. Chai, Rev. Adv. Mater. Sci. 27 (2011) 25.
[55]. M. N. Martin, J. I. Basham, P. Chando, S.-K. Eah. Langmuir 26 (2010) 7410.

What is claimed is:

1. A method for growth of carbon nanotubes, comprising:
(a) preparing graphene-contained powders; and
(b) heating the graphene-contained powders at a target temperature to form the carbon nanotubes,
wherein the graphene-contained powders comprise graphene sheets decorated with iron oxide nanoparticles, and wherein the target temperature is in a range of about 150° C.-400° C.

2. The method of claim 1, wherein the graphene sheets comprise multi-layered graphene sheets.

3. The method of claim 1, wherein the step of preparing the graphene-contained powders comprises:
(a) preparing the graphene sheets having an average dimension of several microns;
(b) treating the graphene sheets with a first solution having carboxylic groups to form a second solution;
(c) filtering, washing and drying the second solution to form a functionalized grapheme powders;
(d) dispersing the functionalized graphene powders in water homogenously to form a third solution;
(e) adding carboxylated iron oxide nanoparticles with the third solution to form a fourth solution; and
filtering and drying the fourth solution to form the iron oxide-graphene powders.

4. The method of claim 3, wherein the first solution comprises sulfuric and nitric acid.

5. The method of claim 4, wherein a ratio of the sulfuric and nitric acid is about 3:1.

6. The method of claim 3, wherein the step of treating the graphene sheets with the first solution having the carboxylic groups to form the second solution further comprises stirring the graphene sheets in the first solution.

7. The method of claim 3, wherein the step of dispersing the functionalized graphene powders in water homogenously to form the third solution is performed by adding the functionalized graphene powders in a deionized water such that the concentration of graphene in the deionized water is about 1 mg/ml.

8. The method of claim 3, wherein the carboxylated metal or metal oxide nanoparticles have a diameter in a range of about 5-15 nm.

9. The method of claim 3, wherein the iron oxide nanoparticles and the third solution are mixed in a 1:1 ratio through sonication.

10. The method of claim 3, wherein the fourth solution is dried at a temperature in a range of about 50-150° C.

11. The method of claim 10, wherein the fourth solution is dried at a temperature of about 100° C.

12. The method of claim 1, wherein the step of heating the graphene-contained powders to form the carbon nanotubes is performed in an electrical furnace.

13. The method of claim 1, wherein the step of heating the graphene-contained powders to form the carbon nanotubes is performed in a radio-frequency (RF) generator with a frequency.

14. The method of claim 13, wherein the frequency is in a range of about 100-700 kHz.

15. The method of claim 13, wherein the step of heating the graphene-contained powders to form the carbon nanotubes is performed in an argon/hydrogen environment that is devoid of a hydrocarbon source.

16. The method of claim 15, wherein the step of heating the graphene-contained powders to form the carbon nanotubes comprises:
(a) spreading the iron oxide-graphene powders on a graphite boat placed inside a quartz tube that is positioned at a center of a generator coil of the RF generator;
(b) flushing the iron oxide-graphene powders with argon;
(c) turning on the RF generator;
(d) heating the iron oxide-graphene powders to the target temperature;
(e) adding hydrogen in the graphite boat at a desired rate for a predetermined time;
(f) turning off the RF generator and stopping adding the hydrogen; and
(g) cooling it to the room temperature under an argon flow.

17. A method for growth of carbon nanotubes, comprising:
(a) providing a graphitic composite;
(b) decorating the graphitic composite with iron oxide nanostructures to form graphene-contained powders; and
(c) heating the graphene-contained powders at a target temperature to form the carbon nanotubes in an argon/hydrogen environment that is devoid of a hydrocarbon source, wherein the target temperature is in a range of about 150° C.-400° C.

18. The method of claim 17, wherein the graphitic composite comprises graphene sheets, multi-layered graphenes, graphite fullerenes, nanofibers, or nanowires.

19. The method of claim 17, wherein the iron oxide nanoparticles have a diameter in a range of about 5-15 nm.

20. The method of claim 17, wherein the step of heating the graphene-contained powders to form the carbon nanotubes is performed in an electrical furnace.

21. The method of claim 17, wherein the step of heating the graphene-contained powders to form the carbon nanotubes is performed in a radio-frequency (RF) generator.

* * * * *